United States Patent
Miyashita et al.

[11] Patent Number: 5,837,031
[45] Date of Patent: Nov. 17, 1998

[54] METHOD FOR PRODUCING IRON CARBIDE

[75] Inventors: Torakatsu Miyashita, Kobe; Yoshio Uchiyama, Akashi; Eiji Inoue; Junya Nakatani, both of Kobe; Teruyuki Nakazawa, Koganei; Satoru Iijima, Naka-gun, all of Japan

[73] Assignees: Kawasaki Jukogyo Kabushiki Kaisha; Mitsubishi Corporation, both of Japan

[21] Appl. No.: 650,419

[22] Filed: May 20, 1996

[30] Foreign Application Priority Data

May 31, 1995 [JP] Japan .............................. HEI 7-158511
Feb. 19, 1996 [JP] Japan .............................. HEI 8-30985

[51] Int. Cl.⁶ .............................. C22B 5/14; C01B 31/30
[52] U.S. Cl. .............................. 75/505; 75/450; 423/439; 266/172
[58] Field of Search .............................. 423/439; 75/450, 75/505; 266/172

[56] References Cited

U.S. PATENT DOCUMENTS

| | | | |
|---|---|---|---|
| 4,720,432 | 1/1988 | Van Slyke et al. | 252/301.16 |
| 4,885,211 | 12/1989 | Tang et al. | 252/310.16 |
| 5,061,569 | 10/1991 | Van Slyke et al. | 252/301.16 |
| 5,104,740 | 4/1992 | Shinkai et al. | 251/301.16 |
| 5,137,566 | 8/1992 | Stephens, Jr. et al. | 75/507 |
| 5,256,945 | 10/1993 | Imai et al. | 252/301.16 |
| 5,346,772 | 9/1994 | Akiyama et al. | 252/301.16 |
| 5,366,897 | 11/1994 | Hager et al. | 75/451 |
| 5,387,274 | 2/1995 | Dam et al. | 423/439 |
| 5,458,977 | 10/1995 | Hosokawa et al. | 252/301.16 |
| 5,618,032 | 4/1997 | Meissner et al. | 75/490 |

FOREIGN PATENT DOCUMENTS

| | | |
|---|---|---|
| 179490 | 3/1990 | European Pat. Off. . |
| 43 20 359 | 10/1994 | Germany . |
| 5226211 | 7/1977 | Japan . |
| 140765 | 8/1989 | Japan . |
| 6-501983 | 3/1994 | Japan . |
| 6501983 | 3/1994 | Japan . |

OTHER PUBLICATIONS

Gonnda, "Iron carbide is now being remarkable as a source of iron," *Tekkokai*, 43, No. 7, pp. 40–44 (1993) Jul.

Geiger, "The potential for use of iron carbide as an electric furnace raw material," 16th Advanced Technology Symposium ISS–AIME Alternate Iron Sources for the Electric Arc Furnace May 2–5, 1993, Myrtle Beach, SC, pp. 1–18.

Swanson, "Iron carbide, a possible replacement for premium quality scrap," Preprint No. 93–28, Presentation at the SME Annual Meeting at Reno, Nevada, Feb. 15–18, 1993, pp. 1–7.

"Role of iron ore supplier in scrap substitute process development," Iron & Steel Scrap, Scrap Substitutes and Direct Steel–Making, at Atlanta Airport Marriott, Atlanta, Georgia, U.S.A., Mar. 21–23, 1995, Povoa, Francisco, p. 13.

(List continued on next page.)

*Primary Examiner*—Melvyn Andrews
*Attorney, Agent, or Firm*—Oppenheimer Wolff & Donnelly LLP

[57] ABSTRACT

An apparatus and method of producing iron carbide of predetermined quality is disclosed. The method of producing iron carbide ($Fe_3C$) comprises reducing and carburizing an iron-containing raw material containing iron oxides (e.g., hematite) or iron hydroxides as main components, wherein the raw material is partially reduced to a reduction ratio of 50 to 65% by a gas containing mainly hydrogen in a first stage of the reaction process, then the partially reduced raw material is further reduced and carburized with a gas containing mainly hydrogen and methane in a second stage of the reaction process to provide iron carbide.

20 Claims, 22 Drawing Sheets

OTHER PUBLICATIONS

Nakagawa et al., "Effects of porosity of iron ore on the synthesis of cementite," *Current Advances in Materials and Processes*, vol. 7, No. 1, p. 85 (1994), Mar.

Hayashi et al., "Synthesis of iron carbide from iron ores in a fluidized bed," *Current Advances in Materials and Processes*, vol. 8, No. 1, p. 111 (1995), Apr.

Hayashi et al., "Synthesis of iron carbide from iron ores," *Current Advances in Materials and Processes*, vol. 8, No. 1, p. 110 (1995) Apr.

Nakagawa et al., "Effects of gas composition and temperature on syntehsis of cementite," *Current Advances in Materials and Processes*, vol. 8, No. 1, p. 109 (1995), Apr.

Mori et al., "New iron–making method and fluidized bed," *Plant and Process*, vol. 28, No. 6, pp. 99–108 (1986), Jun.

"Direct reduction processes existing and under development," T.P. McAloon, I&SM, Feb. 1994, p. 10.

Hess, "Dawn of the iron carbide age?" *33 Metal Producing*, pp. 36,37,49, undated, Jan. 1995.

| CARBURIZATION GAS | METHANE ($CH_4$) | CARBON MONOXIDE (CO) |
|---|---|---|
| TOTAL REACTION FORMULA | $3Fe_2O_3 + 2CH_4 + 5(H_2/CO)$ $= 2Fe_3C + 9(H_2O/CO_2)$ | $3Fe_2O_3 + 2CO + 11(H_2/CO)$ $= 2Fe_3C + 11(H_2/CO_2)$ |
| MAIN GAS FLOW ($Fe_2O_3$ : 3 mole BASIS) | $CH_4$ 3.25 mole → GAS REFORMER (1.25 / 2.0 mole) → HEATING → CARBURIZATION | $CH_4$ 3.25 mole → GAS REFORMER → HEATING → CARBURIZATION |
| REQUIRED GAS REFORMATION ($Fe_2O_3$ : 3 mole BASIS) | $CH_4$ → $CO + H_2$ : 1.25 mole (100%) : 5 mole | $CH_4$ → $CO + H_2$ : 3.25 mole (260%) : 13 mole |

FIG. 10

| CARBURIZATION RATIO (%) | <30 | 30~75 | >75 |
|---|---|---|---|
| CARBURIZATION REACTION $Fe_3O_4 \rightarrow Fe_3C$ | 8~31 | 4~19 | 1~5 |
| CARBURIZATION REACTION $FeO \rightarrow Fe_3C$ | 5~28 | 5~23 | 2~8 |
| CARBURIZATION REACTION $Fe \rightarrow Fe_3C$ | 10~30 | 7~36 | 3~21 |

(WT%)

| TEST NO. | 1 | 2 | 3 | 4 | 5 | 6 | 7 | 8 |
|---|---|---|---|---|---|---|---|---|
| $Fe_3C$ | 86.1 | 86.8 | 84.9 | 82.3 | 85.2 | 82.8 | 85.0 | 81.5 |
| $Fe_2C_3$ | 3.0 | 1.7 | 1.6 | 1.3 | 2.0 | 2.6 | 2.4 | 2.5 |
| $Fe_3O_4$ | 3.5 | 2.1 | 1.6 | 1.1 | 2.9 | 2.6 | 2.5 | 3.2 |
| FeO | -- | 2.1 | 4.8 | 8.1 | 2.4 | 4.7 | 4.8 | 5.4 |
| MFe | 0.7 | 0.7 | 0.4 | 0.6 | 0.8 | 0.7 | 0.6 | 0.8 |
| GANGUE | 6.7 | 6.6 | 6.7 | 6.6 | 6.6 | 6.6 | 6.7 | 6.5 |
| PRESS. ATM | 5 | 5 | 5 | 5 | 3 | 5 | 7 | 5 |

| | DISCHARGE AMOUNT OF PARTICLES | | | PRODUCT $Fe_3C\%$ |
|---|---|---|---|---|
| | $0.5\theta_0$ | $\theta_0$ | $1.5\theta_0$ | |
| a) NO PARTITION | 40% | 63% | 77% | 66% |
| b) LINEAR PARTITION | 14% | 56% | 85% | 84% |
| c) PARTITION WITH FOUR COMPARTMENTS | 3% | 43% | 80% | 90% |

METHOD FOR PRODUCING IRON CARBIDE

FIELD OF THE INVENTION

The present invention relates to a method and apparatus for producing a suitable raw material for iron making and steel making. More particularly, the present invention relates to a method and apparatus for producing a material comprising iron carbide ($Fe_3C$) as the main component, wherein the material is used in an electric furnace and the like for steel making.

BACKGROUND OF THE INVENTION

The production of steel normally comprises the steps of converting iron ore to pig iron using a blast furnace, and thereafter converting the pig iron into steel using an open hearth furnace or a converter. Such a traditional method requires large amounts of energy and large-scale equipment, and has a high cost. Therefore, for a small-scale steel-making operation, a method comprising the steps of directly converting iron ore into raw materials used in the steel-making furnace, and converting the raw material into steel using an electric furnace and the like has been used. With respect to direct iron making, a direct reduction process has been used to convert iron ore into reduced iron.

However, the reduced iron produced by a direct reduction process is highly reactive and reacts with oxygen in the air to generate heat. Therefore, it is necessary to seal the reduced iron with an inert gas, or by some other measure, during transportation and storage of the reduced iron. Accordingly, iron carbide ($Fe_3C$) containing a comparatively high iron (Fe) content, and which has a low reaction activity and can be easily transported and stored, has recently been used as the iron-containing material for steel making in an electric arc furnace and the like.

Furthermore, an iron-making or steel-making material containing iron carbide as the main component is not only easy to transport and store, but also has the advantage that the carbon combined with iron can be used as a source of fuel in an iron-making or steel-making furnace, and can be used as a source to generate microbubbles which accelerate the reaction in the steel-making furnace. Therefore, materials for iron making or steel making containing iron carbide as the main component recently have attracted special interest, as set forth in publications 1, 2, and 3 listed hereafter.

According to one method of producing iron carbide, iron oxides (e.g., hematite ($Fe_2O_3$), magnetite ($Fe_3O_4$), wustite (FeO), etc.) in iron ore are reduced and carburized in a single process. A "single process" means an operation performed by simultaneously introducing a reducing gas and a carburizing gas to a single reactor, as shown in the following reaction formulas (1)–(6). Fine-sized iron ore is charged into a fluidized bed reactor and is reacted with a gas mixture comprising a reducing gas (e.g., hydrogen gas) and a carburizing gas (e.g., methane gas and the like) at a predetermined temperature.

$$3Fe_2O_3+H_2 \rightarrow 2Fe_3O_4+H_2O \tag{1}$$

$$Fe_3O_4+H_2 \rightarrow 3FeO+H_2O \tag{2}$$

$$FeO+H_2 \rightarrow Fe+H_2O \tag{3}$$

$$3Fe+CH_4 \rightarrow Fe_3C+2H_2 \tag{4}$$

$$Fe_3O_4+CH_4+2H_2 \rightarrow Fe_3C+4H_2O \tag{5}$$

$$3FeO+CH_4+H_2 \rightarrow Fe_3C+3H_2O \tag{6}$$

The overall reaction of equations (1) through (4) and (5) and (6) is set forth in reaction formula (7):

$$3Fe_2O_3+5H_2+2CH_4 \rightarrow 2Fe_3C+9H_2O. \tag{7}$$

Further, prior art in the field of the present invention is described, for example, in the publication of the Japanese translation of International Patent Application No. 6-501983 (PCT/US91/05198), including the operation report of industrial equipment in publication 11 listed hereafter, and those described in publications 4, 5, and 8 listed hereafter. In addition, German Patent No. 4320359 discloses a process provided with two-stage reactors.

The carburization process also can be accomplished by using carbon monoxide (CO) as the carburizing gas component as set forth in the following reaction formula (8).

$$3Fe+CO+H_2=Fe_3C+H_2O \tag{8}$$

Prior art in the above-described field further is described in publications 6 and 7 listed hereafter.

TABLE 9

| Publications |
|---|
| 1 "TEKKO KAI," July, 1993, pp. 40–44. "Iron Carbide, iron source attracting interest" |
| 2 "The potential for use of iron carbide as an electric furnace raw material," 16th Advanced Technology Symposium ISS-AIME Alternate Iron Sources for Electric Arc Furnace, May 2–5, 1993, Myrtle Beach. |
| 3 A. W. Swanson, "Iron Carbide, a possible replacement for premium quality scrap," Preprint 93-28, presentation at the SME Annual Meeting, Reno, Nevada, February 15–18, 1993. |
| 4 F. V. Povoa, "Role of iron are supplier in scrap substitute process development," Iron & Steel Scrap, Scrap substitutes direct steel-making, March 21–23, 1995, Atlanta, Georgia. |
| 5 Nakagawa et al., "Influence of the nature of iron ore on the formation of cementite," CAMP-ISU Vol. 7 (1994)-85. |
| 6 Hayashi et al., "Formation of iron carbide from iron ore using fluidized bed (Production of iron carbide-2) CAMP-ISU Vol. 8 (1995)-111. |
| 7 Hayashi et al., "Formation of iron carbide from iron ore (production of iron carbide-1), CAMP-ISU Vol. 8 (1995)-110. |
| 8 Nakagawa et al., "Influence of gas composition and temperature on formation of cementite," CAMP-ISU Vol. 8 (1995)-109. |
| 9 Mori et al., "New iron making process and fluidized bed," Chemical Equipment, June, 1986, pp. 99–108. |
| 10 T. P. McAloon, I&SM, February, 1994. |
| 11 33 Metal Producing, January, 1995 (pp. 36, 37 & 49). |

The above-described conventional methods have the following disadvantages.

Regarding conventional methods described in the publication of the Japanese translation of International Patent Application No. 6-501983 (PCT/US91/05198), and publications 3 and 5, which use present-day industrial equipment, the iron-containing material for iron making contains at least one, or a mixture of two or more, iron oxides, such as hematite, magnetite, and wustite, and iron hydroxides, such as ferrous hydroxide and ferric hydroxide, as the main component, e.g., iron ore or dust and the like generated from iron-making processes. The process of removing oxygen combined with iron atoms of the iron-containing material for iron making uses methane ($CH_4$) as a component in a carburizing reaction gas to convert the iron-containing material into iron carbide (also termed cementite and $Fe_3C$ herein) in a single reactor at a temperature of about 600° C. using a gas mixture containing methane. The gas mixture is suitable for the carburizing reaction, that is, the main reaction (i.e., reduction and carburization) is performed in a single process. Because methane ($CH_4$) in this process is used directly as the carburizing gas, the carbon atom in methane acts as the carburizing component and the hydrogen atoms in methane act as the reducing component. This process has the advantages that the amount of $H_2$ (hydrogen gas) and CO (carbon monoxide) consumed is small and the apparatus is simple. However, the following disadvantages also are apparent.

Because the reaction is a catalytic reaction between a solid iron oxide and reducing and carburizing gases, the reaction speed is slow and the reaction time (i.e., a time required for a complete conversion to the desired iron carbide product) is long, thereby requiring a long time to obtain a predetermined amount of the steel-making material compared to a conventional iron-making method, such as a blast furnace process and the like. Therefore, it is necessary to enlarge the scale of the equipment in order to increase production per unit time. As a result, the main objectives of the direct iron-making method, which are to decrease equipment scale and production costs compared to traditional iron-making methods, are not met.

The reaction temperature preferably is increased in order to increase reaction speed. However, in a reducing reaction of iron oxide, when the reaction temperature is increased to about 600° to 700° C., even though this temperature is below the melting point of iron oxide, the angular surface of an iron oxide crystal becomes smooth due to surface tension (referred to as sintering or semi-melting, hereafter termed "sintering") as the reduction ratio approaches 100%. This phenomena results in a loss of reaction activity. As illustrated in FIG. 8, and in publication 9, a graph of the relationship between reaction temperature and reaction time in the reducing reaction of hematite shows that the reaction time increases in the range of about 600° to 700° C. when about 100% reduction is approached.

Therefore, the objective of increasing reaction speed is not achieved, even if the reaction temperature is increased. When a large amount of water is generated in the reducing reaction, or when the raw material does not flow smoothly due to a structural feature of the reactor, the water reacts with the iron ore to cause local solidification, that is, a so-called "sticking phenomenon" occurs. When sintering or sticking occurs, the iron oxide particles condense or agglomerate and, therefore, become impossible to remove mechanically.

Furthermore, the reducing reaction shown in above reaction formulas (1) through (3), and the carburizing reaction shown in above reaction formula (4), are performed in a single process by contacting iron oxide with a gas mixture containing hydrogen, methane, and the like. Therefore, both the reducing and carburizing reactions must be considered, and the composition of the reaction gas and the reaction temperature cannot be independently set to optimize the reducing and carburizing reactions, respectively.

Therefore, the amount of reaction gas (i.e., the amount of a reaction gas to be contacted in order to produce a unit amount of product) is increased. As shown in Table 8a described hereafter, the amounts of energy, electrical power, cooling water, and the like consumed in a conventional iron carbide producing process described in the publication of the Japanese translation of International Patent Application No. 6-501983 (PCT/US91/05198) are greater than the corresponding amounts used in a conventional direct reduction iron-making process (e.g., the MIDREX process, etc.).

The method described in German Patent No. 4320359 which reduces the amount of the reaction gas, completes the reaction in two stages. In the first stage, iron ore is partially reduced using a mixture of a 50 to 20% equivalent amount of a circulating reaction gas, and a 50 to 80% equivalent amount of a remaining, partially reacted, circulating reaction gas discharged from the second stage. Then, the partially reduced iron ore is transferred to the second stage, and a further reduction and carburization is conducted using 50 to 80% equivalent amount of the circulating reaction gas. An object of the described method is to enhance the reaction efficiency of the gas by bringing 50 to 80% of the circulating reaction gas into contact with the ore in two stages. The described method has accomplished some reduction in the consumption of reaction gas compared to the conventional method described in the publication of the Japanese translation of International Patent Application No. 6-501983 (PCT/US91/05198), or publication 11, which describes present-day industrial equipment.

However, the following disadvantages can be considered. In particular, the circulating reaction gas introduced into the second stage requires a sufficient carbon potential (i.e., chemical reaction force) to produce iron carbide. Therefore, it is necessary to increase the methane concentration of the reaction gas. Accordingly, the concentration of hydrogen gas as the reducing component in the reduction gas is relatively low. Also, because the gas after the completion of the reaction in the second stage contains a high water and carbon dioxide content as products of the reducing reaction, the reduction capability of the gas is lowered. Therefore, the reaction time in the first stage is increased. Accordingly, a reduction in the total reaction time for the first and second stages cannot be achieved.

The gas composition and temperature of the first and second stages cannot be independently set, and, therefore, the reduction ratio or the metallization ratio, and the carburization ratio cannot be independently controlled.

The processes disclosed in publications 6 and 7 use carbon monoxide (CO) gas as the carburizing reaction gas component as described above, and a considerable reduction in reaction time of the carburizing reaction is reported. However, a comparison between the overall reaction formula to fully convert hematite into iron carbide when using carbon monoxide (CO) or methane ($CH_4$), respectively, as the carburizing gas, must be considered.

In case of CO, the overall reaction formula is as follows:

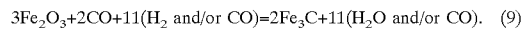
$3Fe_2O_3+2CO+11(H_2 \text{ and/or } CO)=2Fe_3C+11(H_2O \text{ and/or } CO)$. (9)

In case of $CH_4$, the reaction formula is as follows:

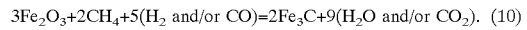
$3Fe_2O_3+2CH_4+5(H_2 \text{ and/or } CO)=2Fe_3C+9(H_2O \text{ and/or } CO_2)$. (10)

As readily illustrated in reaction formulas (9) and (10), when carbon monoxide is used as the carburizing reaction gas component, it is necessary to supply 2.6 times ((2+11)/5) the amount of a gas mixture of CO and $H_2$ compared to using methane. $H_2$ and CO are produced industrially by bringing a natural gas containing methane ($CH_4$) as a main component into contact with steam in the presence of a catalyst at a high temperature and under high pressure, followed by catalytic reaction (referred to as steam gas reforming process). Accordingly, when carbon monoxide is used as the carburizing gas, an expensive steam gas reforming unit is further required and energy consumption increases. This relationship is shown in FIG. 10.

The present invention solves the above-described disadvantages of the conventional method of producing $Fe_3C$. A main objective of the present invention is to provide a method and apparatus for producing iron carbide efficiently and economically. The method and apparatus are capable of shortening the reaction time, reducing consumption of reaction gas and energy, and enabling use of smaller size equipment.

These objects, as well as other objects and advantages of the present invention, will become apparent to those skilled in the art from the following description with reference to the accompanying drawings.

SUMMARY OF THE INVENTION

In order to accomplish the objectives of shortening reaction time, reducing consumption of reaction gas, and enabling use of smaller sized equipment and a compact steam gas reforming unit, a method for producing iron carbide comprises reducing and carburizing iron ore containing hematite as the main component, wherein said method is characterized by partially reducing said hematite in a first stage of a reaction process, and, subsequently, further reducing and carburizing the partially reduced hematite in a second stage of the reaction process.

Preferably, the first stage of the reaction process is performed using a reducing gas containing mainly hydrogen and the second stage of the reaction process is performed using a reducing and carburizing gas containing mainly hydrogen and methane.

Another aspect of the present invention is to provide a method of producing a raw material containing iron carbide as the main component for iron making or steel making. The method comprises reducing and carburizing an iron-containing raw material for iron making, such as iron ore, or dust and the like generated from an iron-making process, which contains at least one or a mixture of two or more iron oxides, such as hematite, magnetite, and wustite, and iron hydroxides, such as ferrous hydroxide and ferric hydroxide, as a main component. Preferably, the partial reduction of the iron-containing raw material for iron making is performed by a reducing gas containing mainly hydrogen in a first stage of the reaction process in order to provide a metallic iron content in a range of 25 to 75 atom % of the total iron content, and, thereafter, further reduction and carburization is performed by a reducing and carburizing gas containing mainly hydrogen and methane in a second stage of the reaction process, in order to achieve an eventual conversion ratio into iron carbide of more than 75 atom % of total iron content.

More preferably, the degree of partial reduction to metallic iron in the first stage of the reaction process is in the range of 30 to 65 atom % of total iron content for feeding to the second stage of the reaction process. Furthermore, the final conversion ratio into iron carbide preferably is not less than 85 atom % of total iron content.

In the first stage of the reaction process, it is preferred to use a reaction gas having a composition that does not allow formation of iron carbide, that is suitable for reduction, and that can be produced industrially and used in a circulating manner. Such a gas contains:

$H_2 + H_2O \geq 40\%$, $CO + CO_2 \leq 10\%$, $CH_4 \leq 30\%$, $H_2O + CO_2 \leq 10\%$.

Because increasing the amount of an inert gas, such as $N_2$, decreases the relative concentration of active reaction gas components, it is preferable that the amount of inert gas is as low as economically possible, particularly from the point of the energy efficiency and reaction time.

In the second stage of the reaction process, a further reduction and carburization are performed, and a raw material for iron making and steel making having the desired degree of carburization is obtained. It is preferred to use a reaction gas having a composition that permits the reducing and carburizing reactions to proceed simultaneously, that can be used in a circulating manner, and that provides a sufficient reaction speed. Such a gas contains:

$H_2 + CH_2 \geq 65\% (CH_4 \geq 20\%)$, $15\% \geq CO + CO_2 \geq 0.5\%$, $H_2O \leq 1.5\%$.

Since $H_2O$ exerts an overall negative influence on the speed of the carburizing reaction, and an increase in the amount of an inert gas such as $N_2$, decreases the relative concentration of active reaction gas components, it is preferred that the amounts of $H_2O$ and inert gases are kept low, particularly from the point of the energy efficiency and reaction time.

It also is preferred to add methane to the reducing gas used in the first stage of the reaction process such that the hydrogen content in the reduction gas can be adjusted, and to add hydrogen or methane to the reducing and carburizing gas used in the second stage of the reaction process such that the hydrogen and methane content in the reducing and carburizing gas can be adjusted.

Furthermore, the reduction degree of hematite as the iron-containing raw material for iron making in the first stage of the reaction process preferably is in the range of 50 to 65%, more preferably 55 to 62%. The term "reduction degree" as used herein means a ratio of the number of oxygen atoms eliminated to the number of oxygen atoms per iron atom of hematite ($Fe_2O_3$) (i.e., the number obtained by subtracting the number of oxygen atoms per iron atom of the iron oxide in which the reduction reaction has proceeded from the number of oxygen atoms of hematite). For example, the reduction degree of magnetite ($Fe_3O_4$), wustite (FeO), and reduced iron (Fe) is about 11%, about 33%, and about 100%, respectively.

The stoichiometric relationship wherein methane ($CH_4$) is used as a reaction gas component for further reducing and carburizing reactions in the second stage of the reaction process is as shown in formula (11):

$$3FeO_{2/3} + CH_4 = Fe_3C + 2H_2O \tag{11}$$

With respect to the actual composition of $FeO_{2/3}$, the relationship between metallic iron (M Fe) and iron oxide (magnetite ($Fe_3O_4$) and/or wustite (FeO)), and, further, reduction degree, when hematite ($Fe_2O_3$) is used as the starting material, is summarized in Table 5. The reduction degree is about 56%.

Preferably, the final conversion ratio of hematite into iron carbide is in the range of 90 to 99%, more preferably 93% or more, and most preferably 95% or more.

The reaction temperature of the first stage in the reaction process preferably is in the range of 550° to 750° C., and more preferably 610° to 650°.

The second stage of the reaction process preferably is performed at a temperature of 550° to 750° C. in order to control the final form (e.g., magnetite, wustite, etc.) of the residual iron oxide in a material for iron making and steel making. In order to provide magnetite as the residual form of iron oxide, which is the most stable form, the temperature preferably is in the range of 550° to 590° C. In order to shorten the reaction time and to perform a stable method, the temperature preferably is in the range of 6100° to 650° C.

The reaction temperature of the second stage of the reaction process preferably is in the range of 590° to 750° C., and more preferably 610° to 650° C.

Water vapor preferably is eliminated from the reaction gas used in the second stage of reaction process to decrease the partial pressure of $H_2O$.

Carbon dioxide and hydrogen preferably are added to the reaction gas used in the second stage of the reaction process.

The reaction pressure of the first stage and the second stage of the reaction process preferably are in the range of 1 to 9.9 kgf/cm$^2$ G ("G" is defined as gauge pressure), and more preferably 2 to 5 kgf/cm$^2$ G.

The raw material supplied to the reactors of the first stage and the second stage of the reaction process preferably are preheated or precooled to a temperature in the range of ±100° C. of the reaction temperature of the respective stage of the reaction process.

An apparatus for performing a process of the present invention produces raw materials for iron making and steel making. The raw materials contain iron carbide as the main component. The apparatus reduces and carburizes an iron-containing raw material for iron making (e.g., iron ore or a dust and the like generated from an iron-making process which contain at least one or a mixture of two or more iron oxides, such as hematite, magnetite, and wustite, and iron hydroxides, such as ferrous hydroxide and ferric hydroxide, as the main component).

The apparatus comprises a first-stage reaction unit for a first-stage reaction process to perform a partial reduction of the iron-containing raw material for iron making, and a second-stage reaction unit for a second-stage reaction process to perform a further reduction and a carburization of the partially reduced iron-containing raw material, wherein a feeding route for the raw material is connected to an upper portion of the first-stage reaction unit, and a feeding route for the partially reduced material exiting a lower portion of the first-stage reaction unit is connected to an upper portion of the second-stage reaction unit, and a recovery route for iron carbide is operatively connected to a lower portion of the second-stage reaction unit, and wherein a circulating loop for a first-stage reaction gas comprises a first-stage reaction gas feed route having one end connected to a gas inlet thereof via a compressor and a heater, and a circulating route exiting a gas outlet of the first-stage reaction unit connected to a second end of the gas feed route via a scrubber, and a circulating loop of the second stage reaction gas comprising a second-stage reaction gas feed route having one end connected to a gas inlet thereof via a compressor and a heater, and a circulating route exiting a gas outlet of the second-stage reaction unit connected to a second end of the gas feed route via a scrubber, wherein a supply route for a reducing gas containing mainly hydrogen is connected to the first-stage reaction gas feed route and a supply route for a reducing and carburizing gas containing mainly methane is connected to a second stage reaction gas feed route, thus allowing a continuous supply of the respective reaction gases to each of the first-stage reaction unit and the second-stage reaction unit.

The apparatus permits an efficient control of the respective reactions in the first stage and second stage of the reaction process in accordance with the reaction processes and conditions described above. Furthermore, essentially all of the respective reaction gases can be used in a circulating manner, and the respective reaction gases can be efficiently used, in a circulating manner, after removing dusts and water. Preferably, the apparatus of the present invention is constructed as illustrated in FIG. 5, for example, an independent gas loop for the purpose of adjusting the composition of the reaction gas in each stage of the reaction is connected to each reaction apparatus and respective gas-circulating loop.

The first-stage and second-stage of the reaction process preferably are performed using fluidized bed reactors. Preferably, the fluidized bed reactor has partition walls for preventing a direct movement of raw material particles from the inlet to the outlet of the reactor.

The first stage and second stage of the reaction process for preparing an iron-containing raw material for iron making which contains mainly coarse particles, preferably is prepared in a rectangular vertical moving bed reactor provided with multi-layer inlet and outlet wind boxes located at corresponding heights along opposite rectangular walls, such that a gas flows horizontally through the reactor, and charged solid material flows vertically, e.g., the furnace illustrated in FIG. 21.

The present method of producing iron carbide and an apparatus having the above construction demonstrate the following advantages:

1. According to the present method of producing iron carbide, the reaction process is divided into a first stage for partially reducing hematite, and a second stage for further reducing and for carburizing the metallic iron in the iron-containing raw materials for iron making. Therefore, the gas used in the first stage of the reaction process can be a composition which is optimized for the reducing reaction, and the gas used in the second stage of the reaction process can be a composition which is optimized for the further reducing and the carburizing reactions. In accordance with the present invention, the reaction speed can be increased compared to a process for producing iron carbide wherein the reduction and carburization of hematite (i.e., conversion to iron carbide) is performed in a single process using a mixed gas of the reducing and carburizing gases. Accordingly, the reaction time (i.e., a time required for converting the iron content in hematite into iron carbide to the desired conversion ratio) can be shortened.

When the reduction degree is high, the reduction of hematite causes sintering at a reaction temperature in the range of about 600° to 700° C., which in turn increases reaction time. In conventional processes, sintering is prevented by adjusting the reaction temperature to about 590° C. To the contrary, in the present process of producing iron carbide, the reducing reaction is divided into a first stage and a second stage, and the partial reduction in the first stage of the reaction process can be adjusted to the degree where no sintering occurs. Therefore, it is possible to perform the reducing reaction at the above-mentioned reaction temperature. Accordingly, it is possible to perform the reaction at a temperature higher than that of a conventional process, and, accordingly, the reaction speed is further increased to shorten the reaction time.

Furthermore, the flow rate of the reducing and carburizing gases required in the first stage and second stage of the reaction process can be substantially decreased due to the above-described features of higher temperature and shorter reaction time, etc.

Since the present reaction process is divided into two stages for producing iron carbide, two gas systems are required. This makes the system complex, but the productivity of a reactor of the same size is increased by the above-mentioned shortening of the reaction time. On the other hand, a smaller reactor can be used if an increase in production is not desired.

The degree of progress of the reducing reaction i.e., reduction ratio, can be determined by measuring the amount of steam generated in the first stage of the reaction process. Therefore, control of the conversion ratio to iron carbide is facilitated, even if the reaction time varies because of a variation in quality of hematite.

It also is possible to utilize the following variations and modifications which cannot be employed in a conventional process for producing iron carbide using a single process, as disclosed in the publication of the Japanese translation of International Patent Application No. 6-501983 (PCT/US91/05198). Therefore, the present process is flexible.

a. The carburizing gas has a tendency to pyrolytically decompose to generate free carbon. To prevent decomposition, the steam in the reaction gas can be maintained at over a minimum constant concentration. Such a process step can be used only with respect to the gas used in the second stage of the reaction process.

b. In order to decrease the concentration of CO and $CO_2$, which can cause the generation of free carbon, it is useful, for example, to remove them from the gas by a $CO_2$ scrubber. The present method makes it possible to prevent the generation of free carbon, and to increase the concentration of hydrogen gas, by subjecting CO and $CO_2$, which accumulate toward a chemical equilibrium composition in the reaction gas of the first stage of the reaction process, to the above scrubbing operation.

c. When the conversion ratio of iron carbide becomes too high, and the Fe content becomes scarce, the methane gas can be decomposed into carbon and hydrogen. Control of the conversion ratio can be performed only in the second stage of the reaction process.

2. According to the present method of producing iron carbide, the first stage of the reaction process is performed using a reducing gas containing mainly hydrogen, and the second stage of the reaction process is performed using a reducing and carburizing gas containing mainly hydrogen and methane. Therefore, a partial reduction is achieved in the first stage of the reaction process, and a further reducing reaction and a carburizing reaction are achieved in the second stage of the reaction process, and the above advantage (1) can be realized.

Furthermore, the following advantages can be attained, which cannot be attained using the conventional process for producing iron carbide disclosed in German Patent No. 4320359.

a. With respect to the first stage of the reaction process having an independent circulating gas loop of a reaction gas, it is possible to use a gas containing a high hydrogen content (i.e., suitable for reduction), and having high reducing capability because of a low water and carbon dioxide content. Therefore, the reaction time is substantially shortened. In contrast, in the conventional process, the concentration of the gas component which is essential for the carburizing reaction (i.e., methane) is high and the concentration of hydrogen is relatively low, and, in addition, the gas contains water generated by the reducing reaction in the second stage of the reaction process retained in the gas component. Therefore, the reaction time of the first stage comes long.

b. Because the reaction gas for the first stage of the reaction process is a reducing gas, essentially no iron carbide is generated in the first stage of the reaction process. Therefore, the reduction degree, or the metallization degree, can be controlled such that the reduction ratio is optimized for rapidly achieving the desired carburization ratio in the carburizing reaction of the second stage of the reaction process.

On the other hand, because the conventional process uses a gas having a composition basically for the carburizing reaction, it is difficult to independently control the reduction, or metallization, degree, and the carburization ratio, in the first stage of the reaction process.

c. Since the first stage and second stage of the reaction process, respectively, have independent circulating loops of a reaction gas, it is possible to provide a gas composition which is optimized for the respective stages, and to independently react at an optimized temperature for each respective stage.

On the other hand, because a single circulating gas is used in the conventional process, independently controlling the temperature of the first and second stages is limited.

In comparison to a conventional process for producing iron carbide which uses CO gas as a carburizing gas component, as disclosed in publications 6 and 7, the carburizing and reducing reactions in the second stage of the reaction process are performed using methane, which is the main component of natural gas. Methane is the main reaction gas component in the present invention. Therefore, the apparatus for methane-reforming to $CO+H_2$ by steam can be made small to a scale of 1/2.6, thereby reducing energy consumption and downsizing the equipment.

3. According to the present method of producing iron carbide, an iron-containing raw material for iron making other than iron ore containing hematite as the main component, such as dust and sludge generated from iron works which comprises iron oxides (e.g., magnetite, etc.), compounds thereof with water, and one or more iron hydroxides, wherein the amount of metallic iron atoms is not more than 50 atom % of total iron atoms, that is, the amount of iron content as iron oxide or iron hydroxide is at least 50 atom % can be effectively processed. The advantages are achieved because the first stage of the reaction process is performed under optimum operating conditions (e.g., temperature, pressure, gas composition, etc.) corresponding to the specific mixture of iron compounds in the iron-containing raw material for iron making, thereby reducing the influence of the identity of an iron compound as starting material, and supplying to the second stage of the reaction process a partially reduced iron compound having the optimum reduction ratio and metallic iron atom ratio. Therefore, the advantages described above (1) and (2) can be obtained, independent of the identity of the iron compound as the starting material. In addition, disadvantages of the conventional process can be overcome by shortening the reaction time, decreasing energy consumption, and enabling the use of compact apparatus.

If the iron-containing raw materials contain metallic iron atoms in an amount of 50 atom % or more of the total iron content, it is more effective to directly perform the second stage of the reaction process without performing the first stage of the reaction process, because the metallic iron content of the raw material already is in the desired range.

In the first stage of the reaction process, the iron-containing raw material for iron making, containing various iron oxides, iron hydroxides, or a mixture thereof as the main component, is reduced to adjust the metallic iron content within the range of 25 to 70 atom % of the total iron content, and then further reducing and carburizing reactions are performed by a reaction gas containing methane as the main component in the second stage of the reaction process. Because the amount of hydrogen gas generated from methane in the carburizing reaction of the second stage can be essentially identical to the amount of hydrogen gas consumed in the reducing reaction of the second stage, it is possible to have the further reduction and the carburization reactions in the second stage proceed by supplying methane as the main component of the reaction gas. This result is due to a chemical reaction balance, and is not influenced by the identity and proportion of the iron oxide in the iron-containing raw materials. Therefore, the supply of hydrogen and carbon monoxide used in the conversion can be limited to small amounts, making it possible to use a small apparatus for gas reformation using steam.

The present invention, therefore, relates to a process of directly using methane as a main reaction component in the carburizing reaction in order to decrease the amount of methane in the natural gas that is reformed into hydrogen and carbon monoxide, as described above.

When using hematite as the starting material, the reaction converting iron oxide into iron carbide ($Fe_3C$) using methane can be classified into three reaction forms shown in FIG. 12. These reactions have been studied from a viewpoint of reaction kinetics. As a result, the data summarized in FIG. 13 was obtained.

1. The reaction speed from metallic iron to $Fe_3C$ is the fastest. Considering only the carburizing reaction, the advantage of a process which reduces iron oxides or iron hydroxides, or a mixture thereof, to a metallic iron, followed by conversion into iron carbide ($Fe_3C$), is shown.

2. On the other hand, when iron oxides are converted into iron carbide using methane, the hydrogen atoms in methane ($CH_4$) also take part in the reducing reaction, as shown in the above formula (11) and FIG. 10, thereby making it possible to decrease the feed of hydrogen and/or carbon monoxide through gas reformation. It is important to consider the effects of the above items (1 and 2), and a correlation between the metallization degree in the first stage of the reaction process, and the time of overall reaction process (i.e., total of the first-stage and second-stage reaction process time) is shown in FIG. 14. When the proportion of metallic iron is in the range of 25 to 70 atom %, the overall reaction process time can be shortened. When the proportion is in the range of 30 to 65 atom %, the shortest overall reaction process time can be realized.

According to the present invention, the final conversion ratio from the iron-containing raw material for iron making to iron carbide is 75 atom % or more. The required optimum conversion ratio of the material for iron making and steel making into iron carbide varies depending on the process (e.g., iron making, steel making, etc.), and purpose of said process, and the present invention can meet any requirements. For example, when the main objective is to provide a material for an iron source, as well as for an energy source in a steel-making furnace, and a low energy consumption is required, high conversion ratio to $Fe_3C$ of 90% or more is preferable. On the other hand, the accelerating effect of the refining reaction sometimes is mainly expected by a stirring effect attributed to bubbles generated by the reaction shown in the following formula (12), even if the energy consumption increases to some extent:

$Fe_3O_4+4Fe_3C=15Fe+4CO$ (12)

In this case, an $Fe_3C$ product having conversion ratio of about 75 atom % can be used. That is, the optimum conversion ratio to $Fe_3C$ meeting with the respective requirement for the use of the materials for iron making and steel making can be achieved.

4. According to the present method of producing iron carbide, the first stage of the reaction process is a process of partially reducing the iron-containing raw materials for iron making to adjust the metallic iron content in the range of 25 to 70 atom %, i.e., the reducing reaction of the iron oxide is the main reaction. The reducing gas for iron oxide contains hydrogen ($H_2$) and carbon monoxide (CO). The greater the concentration of ($H_2$+CO) and the lower the concentration of ($CO_2$+$H_2O$) as reduction products, the greater the reaction speed.

The reducing reaction speed using $H_2$ is greater than using CO at the present reaction temperature ranges, and a shortened reaction time and a decrease in consumption of reaction gas can be accomplished. Furthermore, the reaction product of hydrogen is steam ($H_2O$) which can be removed by simply cooling the exhaust gas during treatment. Accordingly, when using hydrogen as the main component, a reaction gas can be used easily, in a circulating manner, without accumulating $H_2O$, or increasing $H_2O$ concentration.

The above composition can be used as the gas for conducting the first stage of the reaction process. That is, the reaction for producing iron carbide represented by the formula (4) can be suppressed by maintaining a low methane concentration. Therefore, no iron carbide is produced, and the reducing reaction can be efficiently performed. As a result, it is possible to provide an apparatus which can be used practically in industry.

5. According to the present method of producing iron carbide, the remaining reducing and carburizing reactions of the iron-bearing raw material for iron making, which was partially reduced and metallized in the first phase, are performed using hydrogen and methane as the main gas components, and restricting the concentration of other components, thereby shortening the reaction time and decreasing consumption of the reaction gas.

A sufficient carbon potential (i.e., chemical reaction force) is required to produce iron carbide ($Fe_3C$). In the case of a carburizing reaction using methane, as is apparent from formula (4), the reaction is in proportion to $PCH_4/(PH_2)^2$, wherein $PCH_4$ is partial pressure of methane ($CH_4$), and $PH_2$ is partial pressure of hydrogen ($H_2$) in the reaction gas. In the case of a reducing reaction using hydrogen, as is apparent from formulas (1), (2), and (3), $PH^2/PH_2O$ (wherein $PH_2O$ is the partial pressure of steam) of the reaction gas is in proportion to a reducing capability (i.e., chemical reaction force with respect to reduction). In the present invention, where the main component of the reaction gas is methane and hydrogen, and the concentration of methane and hydrogen are adjusted to a proper proportion, and, further, steam ($H_2O$) is maintained at a predetermined concentration or less, the reducing and carburizing reactions are allowed to proceed promptly and simultaneously, thereby accomplishing a high reaction efficiency of the reaction gas. When the gas used in the second stage of the reaction process has the following composition:

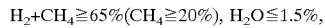
$H_2+CH_4 \geq 65\% (CH_4 \geq 20\%)$, $H_2O \leq 1.5\%$, the gas meets the above conditions.

Then, CO or $CO_2$ acts as the reaction gas component of the carburizing reaction, and also as a catalyst in the carburizing reaction of methane according to formula (10). As a result, the reaction speed is increased. Accordingly, it is preferable that CO or $CO_2$ is present in a predetermined concentration in order to shorten the reaction time. After identical first stages of the reaction process were conducted using the experimental apparatus of FIG. 1, second stages of the reaction process were conducted by changing the percentage of CO+$CO_2$ in the inlet reaction gas. The results are summarized in FIG. 11.

FIG. 11(a) illustrates a relationship between the average carburizing rate at a carburization ratio of 30 to 75% and inlet percentage of $CO+CO_2$. As shown in FIG. 11(a), the average carburizing speed increases as the inlet ($CO+CO_2$) percentage increases, and the average carburizing speed is saturated at about 20%. For practical industrial applications, it is desired that the average carburizing speed is not less than 6%/hour, and, therefore, it is important for the percentage of $CO+CO_2$ to be at least about 0.3%. The average outlet-inlet ($CO+CO_2$) percentage during the second stage of the reaction process, when the inlet ($CO+CO_2$) % of the second stage gas is changed, is shown in FIG. 11(b). As is apparent from FIG. 11(b), when the inlet ($CO+CO_2$) % is low, $CO+CO_2$ is produced during the reaction between $CO+CO_2$ and material. When the inlet ($CO+CO_2$) % is high, $CO+CO_2$ is consumed. That is, when the inlet $CO+CO_2$ is not less than about 3%, it is sometimes necessary that $CO+CO_2$ is supplied to the circulating gas.

It is an object of the present invention to use methane as the main reaction component in the carburizing reaction to minimize the feed of $CO+H_2$ by reforming natural gas as described above. Accordingly, by satisfying the following formula:

$$15\% \geq CO+CO_2 \geq 0.5\%,$$

the industrially important effect of reaction speed (i.e., shortening of reaction time) is obtained, and, at the same time, high carburizing reaction efficiency is achieved. Therefore, when the gas used for conducting the second stage of the reaction process has the composition satisfying the following formula:

$$H_2+CH_5 \geq 65\%(CH_4 \geq 20\%),$$

$$15\% \geq CO+CO_2 \geq 0.5\%, H_2O<1.5\%,$$

inert gas component such as $N_2 \leq 20\%$, the reaction time is shortened, thereby making it possible to use the method in practical industrial applications.

6. According to the present method of producing iron carbide, the proportion of hydrogen gas can be changed by adding methane gas to the reducing gas of the first stage of the reaction process, thereby allowing control of the reaction speed of the reducing reaction. Therefore, it is possible to control the reduction degree in the first stage of the reaction process, control the reaction time to attain the predetermined reduction degree, and, at the same time, control the amount of metallic iron in the product of the first stage of reaction process.

Also, it is possible to prevent deterioration of the reducing capability of the gas (i.e., decrease in CO and $H_2$ concentration, and increase in $H_2O$ concentration) by controlling the synthesis of methane from the reaction between carbon monoxide and hydrogen set forth in the following formula (13). The reaction speed of the reducing reaction is maintained, thereby making it possible to control the reaction time and to decrease reaction gas consumption and the feed of hydrogen and carbon monoxide.

$$CO+3H_2=CH_4+H_2O \quad (13)$$

Furthermore, it is possible to change the composition ratio of hydrogen to methane by adding hydrogen or methane to the reducing and carburizing gas in the second stage of the reaction process. Therefore, the reaction speed of the carburizing reaction can be controlled. Accordingly, it is possible to control the carburization ratio (i.e., conversion ratio into iron carbide) and reaction time until a predetermined carburization ratio is obtained in the second stage of the reaction process.

A relative relationship between reaction speed of the remaining reducing reaction and that of the carburizing reaction can be controlled, thereby making it possible to continue the reducing reaction shown in the formulas (1), (2), and (3), while conducting the carburizing reaction shown in the formula (4). In addition, the carburization ratio of the final product, as well as form and amount of the residual iron oxide, can be controlled, and, at the same time, the reaction time can be shortened and the most efficient use of reaction gas in a circulating manner can be accomplished.

7. According to the present process for producing iron carbide, if the reduction degree of hematite in the first stage of the reaction process is in the range of 50 to 65%, then, the total reaction time, as the total of the first and second stages of the reaction process, is the shortest, and, at the same time, the amount of hydrogen gas generated by the carburizing reaction in the second stage of the reaction process and the amount of hydrogen gas required for the reducing reaction are almost identical. Therefore, the second stage of the reaction process can be performed by supplying only the carburizing gas from a point of the chemical reaction balance.

Because the reaction speed of a catalytic reaction between a solid and a gas normally is low, the gas is circulated, thereby taking effective use of the gas into consideration. That is, a component of the reaction gas is supplied to maintain a constant composition of the reaction gas, while circulating a fixed amount of the reaction gas. In the present invention, hydrogen and methane can be supplied in the first and second stages of the reaction process, respectively.

8. According to the present method of producing iron carbide, the final conversion ratio of hematite to iron carbide is in the range of 90 to 99 atom %, and, therefore, a suitable product is obtained. When the conversion ratio is less than 90 atom %, the quality of the iron carbide is low. On the other hand, when the conversion ratio is greater than 99 atom %, the amount of generated free carbon becomes large.

9. According to the present method of producing iron carbide, the reaction temperature of the first stage of the reaction process is in the range of 550° to 750° C., and, therefore, a temperature suitable for performing the above reaction is obtained. When the reaction temperature is less than 550° C., the reaction speed is low and the reaction time is long. Therefore, it is necessary to adjust the temperature higher than 550° C. On the other hand, when the reaction temperature is greater than 750° C., it adversely affects the heat-resistant structure of the reactor. As described above, in the reducing reaction of hematite, sintering occurs in the range of about 600° to 700° C. resulting in increase of the reaction time, and, therefore, the reaction is conducted at a temperature lower than the above temperature range, e.g., at about 590° C. in the traditional method. In the present method of producing iron carbide, the reducing reaction is divided into two stages and the reduction degree in the first stage of the reaction process is not particularly high. Therefore, even if the reaction temperature is high, no sintering occurs and adverse affects, such as a lower reaction speed, do not occur.

10. According to the present method of producing iron carbide, the reaction temperature of the second stage of the reaction process is in the range of 550° to 750° C. Therefore, sintering or adhesion of the reacted iron ore to the furnace wall does not occur, which makes it easy to control the form (e.g., magnetite or wustite) of the residual iron oxide in the iron carbide product and to shorten the reaction time.

That is, in the second stage of the reaction process, remaining reduction, carburization, and conversion into iron are allowed to proceed simultaneously (since carburization proceeds when the reduction ratio is high, sintering is less likely to occur than in the case where only reduction is conducted), and the reaction is conducted in the range where the sintering or adhesion of iron ore to the furnace wall does not arise. Therefore, the reaction time is shortened when the reaction temperature is increased. Accordingly, the second stage preferably is conducted in the range where sintering or adhesion of iron ore to the furnace wall does not occur, e.g., 610° to 750° C.

In the second stage of the reaction process, it is also important not only to achieve the desired conversion ratio into iron carbide ($Fe_3C$), but also to control the chemical form (e.g., metallic iron (Fe), magnetite ($Fe_3O_4$), wustite (FeO), etc.) of the residual iron in order to obtain product stability against spontaneous combustion during transport and long-term storage of the product. The relative stability of iron compounds with respect to an exothermic reaction with water is in the order of $Fe_3O_4$ (most stable), FeO, and Fe. At the time of long-term transport and storage, it is sometimes desired to convert as much of the residual iron component as possible, i.e., the component other than iron carbide ($Fe_3C$) in the iron carbide product, to $Fe_3O_4$, which is most stable. In that case, as is apparent from FIG. 9, FeO does not exist at about 575° C. or less, and, therefore, it is possible to conduct the reaction at a temperature of about 550° to 570° C., such that all the residual iron component is in the form of $Fe_3O_4$.

11. According to the present method of producing iron carbide, the reaction temperature of the second stage of the reaction process is in the range of 590° to 750° C., which is a suitable temperature for rapidly producing iron carbide. The reason is as follows. As shown in FIG. 9, the magnetite ($Fe_3O_4$) region is broad at a reaction temperature of 590° C. or less in the Fe—H—O system reduction equilibrium. When magnetite is present in the reducing reaction for a long period of time, the final stage of the carburizing reaction to produce iron carbide is slowed down, and it takes a long time to fully convert to $Fe_3C$. Therefore, it is necessary to adjust the reaction temperature to 590° C. or more, which is far from the magnetite zone, and the ratio of $H_2O$ to ($H_2O+H_2$) can be set at comparatively high level. That is, the reduction can be conducted to obtain as much metallic iron content as possible using the same ratio of $H_2O$ to ($H_2O+H_2$) and the same amount of the reaction gas, and the higher carburizing reaction speed from the metallic iron-to-iron carbide can be maintained even at the final stage of the carburizing reaction into iron carbide because of existence of metallic iron. On the other hand, when the reaction temperature is adjusted to 750° C. or more, it adversely affects the heat-resistant structure of the reactor. Further, carburization is conducted progressively after reduction in the second stage of the reaction process, and, therefore, no sintering arises. Accordingly, the reaction temperature can be increased.

12. According to the present method of producing iron carbide, steam is removed from the reaction gas used in the second stage of the reaction process to decrease the partial pressure of steam. Therefore, the FeO—Fe zone can be widened and the magnetite zone can be narrowed in the Fe—H—O system reduction equilibrium. Accordingly, it is possible to prevent slowing down of the carburizing reaction because of the presence of magnetite, thereby shortening the reaction time.

13. According to the present method of producing iron carbide, carbon dioxide and hydrogen are added to the reaction gas in the second stage of the reaction process. Thereby, the following reaction formula (14) proceeds, and the concentration of carbon monoxide and carbon dioxide increases. As the result, the carburizing reaction speed can be substantially increased.

$$CO_2+H_2 \rightarrow CO+H_2O \tag{14}$$

14. According to the present method of producing iron carbide, the reaction pressures of the first and second stages of the reaction process are in a range of 1 to 9.9 kgf/cm² G. This reaction pressure is suitable to achieve the above reactions. When the reaction pressure is less than 1 kgf/cm² G, the reaction speed is low, and, therefore, reaction time is long. On the other hand, when the reaction pressure is more than 9.9 kgf/cm² G, steam in the reactor is condensed and adheres to the feed raw materials. The feed then does not flow uniformly, which results in decrease of the conversion ratio into iron carbide. In addition, higher pressure badly affects the strength of the reactor and reactor gas supply tube.

With respect to the influence of pressure on the reducing reaction, which is mainly conducted in the first stage of the reaction process, and on reducing reaction speed, the reducing degree normally increases as the pressure increases to 5 to 6 atm (i.e., above 4 to 5 kgf/cm² G). When the pressure is greater than the above range, the influence of pressure on the reducing rate is small, and the pressure of 6 atm less is economical for practical use.

In the second stage of the reaction process, the remaining reducing and carburizing reactions are conducted. In order to maintain high reducing and carburizing reaction forces, even if the gas is used in a circulating manner, it is preferable that $H_2O$ generated in the reducing reaction is removed to reduce the $H_2O$ concentration as much as possible. When the gas is subjected to a cooling treatment to remove $H_2O$, the amount of $H_2O$ can be relatively lowered when the pressure is high. As the pressure increases, the equilibrium concentration of the methane component of the carburizing reaction increases, and the concentration of hydrogen as the reducing component becomes relatively lower. Therefore, it is preferable to operate under a sufficient pressure to maintain a proper relationship between the reducing rate and carburizing rate. A preferable pressure is about 3 to 6 atm. This operating pressure can be adjusted to a proper level, thereby making it possible to shorten the reaction time and to achieve favorable reaction economics.

15. According to the present method of producing iron carbide, a fine-sized raw material introduced into reactors of the first and second stages of the reaction process are preheated or precooled to a temperature within ±100° C. of the reaction temperature of each phase. Therefore, the raw material feed does not agglomerate, and condensed steam does not adversely affect the ability of the raw material to flow. Because the reducing reaction shown in above formulas (1) to (3) is an endothermic reaction, the feed is cooled. The feed supplied to the second stage of the reaction process has particularly high reaction activity and generates steam rapidly at the beginning of the reaction to cool the feed, and, therefore, the generated steam is condensed to adhere to the feed, thereby inhibiting the flow of the feed. Accordingly, the feed supplied to the reactor is preheated to about the reaction temperature to prevent steam from condensing and to prevent a decrease in reaction speed.

Furthermore, the temperature of the first stage of the reaction process can exert an influence on the reaction speed of the subsequent second stage of the reaction process depending upon the form of the iron-bearing raw material for iron making. For example, the surface area per unit weight of the raw material is increased by conducting the reduction of the first phase at a temperature which is several tens of degrees lower than that of the second reaction process. This supplies a raw material to the second stage of the reaction process having a more active and partially metallized state. Then, the remaining reducing and carburizing reactions of the raw material, which is reactively active, are performed, which results in a shortened total reaction time.

In order to maximize the amount of residual iron component of the iron carbide product as stable magnetite, and also to shorten the total reaction time, it also is possible to perform the second stage of the reaction process at a low temperature, such as 575° C. or less, after the first stage is conducted at a temperature as high as possible.

In accordance with the present invention, it is sometimes necessary to add a sufficient heat to the raw material in the reactor of the first stage of the reaction process, and to charge a preheated raw material for the purpose of supplying a portion of the reaction heat, thereby avoiding excessive heating of the reaction gas. In addition to preheating the raw material charged in the first stage of the reaction process, it is sometimes necessary to perform a preliminary treatment, such as removal of combined water from the starting material. In that case, it is effective to conduct the preheating operation at a temperature which is at least 100° C. higher than the temperature of the first stage of the reaction process, as a matter of course. The present invention covers such an operation.

16. With respect to a present apparatus for producing iron carbide, one embodiment thereof is set forth in FIG. 5. The first stage of the reaction process performs a reduction until 25 to 70 atom % of total iron in the raw material is metallized, and the second stage of the reaction process performs the remaining reduction and conversion into iron carbide ($Fe_3C$). The reactions are respectively conducted in independent reaction apparatus 41 and 61. The removal of dust from an exhaust gas after completion of the reactions and removal of an impurity gas component are conducted in scrubbers 45 and 65. Reaction gases, after being supplemented with a reduction gas or a carburization gas for the control of the gas composition, are fed to reactors 41 and 61, via recirculation compressors 42 and 62 and gas heater 43 and 63, first-stage gas circulation loop 40, and second-stage reaction gas circulation loop 60, making it possible to feed a reaction gas to first-stage reactor 41 and to second-stage reactor 61, independently. Furthermore, it is easy to adjust and control the respective optimum operating conditions corresponding to the components and reaction characteristics of the raw material, and control components in the final product. It is also possible to downsize the equipment and decrease energy consumption, thereby improving economy.

The above apparatus can serve as a batch-wise production apparatus or a continuous production apparatus by supplying a raw material to a first reaction apparatus 41 via a raw material supply line 80, and by transferring a partially metallized raw material prepared in first reaction apparatus 41 to a second reaction apparatus 61 via a transfer line 81, and discharging an iron carbide product prepared in second reaction apparatus 61 via a discharging line 82, either batch-wise or continuously. In case of a continuous production process, particularly, an $Fe_3C$ product having a high carburization ratio, or an $Fe_3C$ product having a slight variation in composition, can be efficiently produced using a fluidized bed reaction apparatus, wherein an inner reaction zone contains a partition wall to provide a route for the raw material through the reaction apparatus.

Furthermore, in accordance with the embodiment illustrated in FIG. 16, when connecting lines 101 and 102 are provided between first-stage gas circulating loop 40 and second-stage gas circulating loop 60 to supply a portion of a gas containing a high concentration of hydrogen component in first-stage gas circulating loop 40 to second-stage gas circulating loop 60, or to supply a portion of a gas containing a high concentration of methane in second-stage gas circulating loop 60 to first-stage gas circulating loop 40. Lines 101 and 102 make it possible to supply a particular reaction gas component (e.g., hydrogen, methane, etc.) in an amount corresponding to the amount of the gas component is consumed, which in turn corresponds to the amount of reaction in the respective reactors, and make it possible to efficiently control the concentration of reaction gas components.

17. According to the present apparatus for producing iron carbide, both first and second stages of the reaction process, respectively, are conducted in a fluidized bed reactor. A fluidized bed reactor optimizes a reaction which brings a solid iron-containing raw material for iron making into contact with a reducing and a carburizing gas for conversion into iron carbide. A fluidized bed reactor uniformly conducts a reaction wherein a fine-sized iron-containing raw material is charged into an upper portion of the reactor, and a reaction gas is supplied from a lower portion of the reactor. The supply and discharge of raw material and product can be continuously performed. Furthermore, the reaction time is shortened because of large contact area.

18. According to the present apparatus for producing iron carbide, a reactor provided with partition walls for preventing direct movement of raw material from the inlet to the outlet is used as the fluidized bed reactor. Such a reactor prevents the raw material and the reaction product from mixing in the reactor. Accordingly, the conversion ratio into an $Fe_3C$ product can be increased. Normally, it is difficult for one fluidized bed reactor having no partition wall to increase the reaction degree, and, therefore, the reaction degree is increased by connecting a plurality of reactors in series. In accordance with the present invention, it is possible to obtain a high reaction degree using only one fluidized bed reactor having partition walls.

It is possible to prevent a raw material (i.e., feed) at the inlet of the reactor and the product at the outlet from mixing, and, therefore, the reaction can be uniformly conducted.

19. According to the present apparatus for producing iron carbide, it is possible to efficiently produce iron-containing raw materials for iron making, even if the raw material contains a large amount of coarse particles having a diameter of greater than 6 mm. In the method of the present invention, the amount of reaction gas is comparatively large, and the reaction gas is sufficiently contacted with the solid particles. A fluidized bed reactor is suitable as the reaction apparatus for a fine-sized raw material. In case of the raw materials containing a large amount of coarse particles having a diameter of greater than 6 mm, for example, a large amount of reaction gas is required for fluidizing. In this case, however, in a vertical moving bed reactor, it is necessary to horizontally flow the gas in order to decrease a pressure loss and to bring a comparatively large amount of gas into contact with a new gas, uniformly, along the vertical direction. Accordingly, it is possible to supply a reaction gas, uniformly, along the vertical direction by supplying a reaction gas through inlet and outlet wind boxes located along the corresponding heights of opposite rectangular reactor walls.

It is possible to conduct the first and second stages of the reaction process using one vertical moving bed reactor by connecting the upper inlet and outlet wind boxes to a supply duct for a reaction gas and to an exhaust gas duct for the first stage of the reaction process, respectively, and connecting the lower inlet and outlet wind boxes to a supply duct for a reaction gas and an exhaust gas duct for the second stage of the reaction process. In this case, it is possible to prevent the first and second-stage reaction gases from mixing by adjusting the distance between the lowermost stage wind box for the first reaction gas and the uppermost stage wind box for the second reaction gas to one to two times as long as the length between walls in the horizontal gas flow direction of the reactor.

BRIEF DESCRIPTION OF THE DRAWINGS

FIG. 10 is a table illustrating a relationship between types of carburizing reaction gas and requisite amount of steam-gas reformation;

DESCRIPTION OF THE INVENTION

Hereafter, experiments for practicing the method of producing iron carbide in accordance with the present invention, and results thereof, are explained. Furthermore, embodiments of an apparatus for producing iron carbide in accordance with the present invention is explained, together with the production process.

1. Experimental Apparatus

Figure 1:
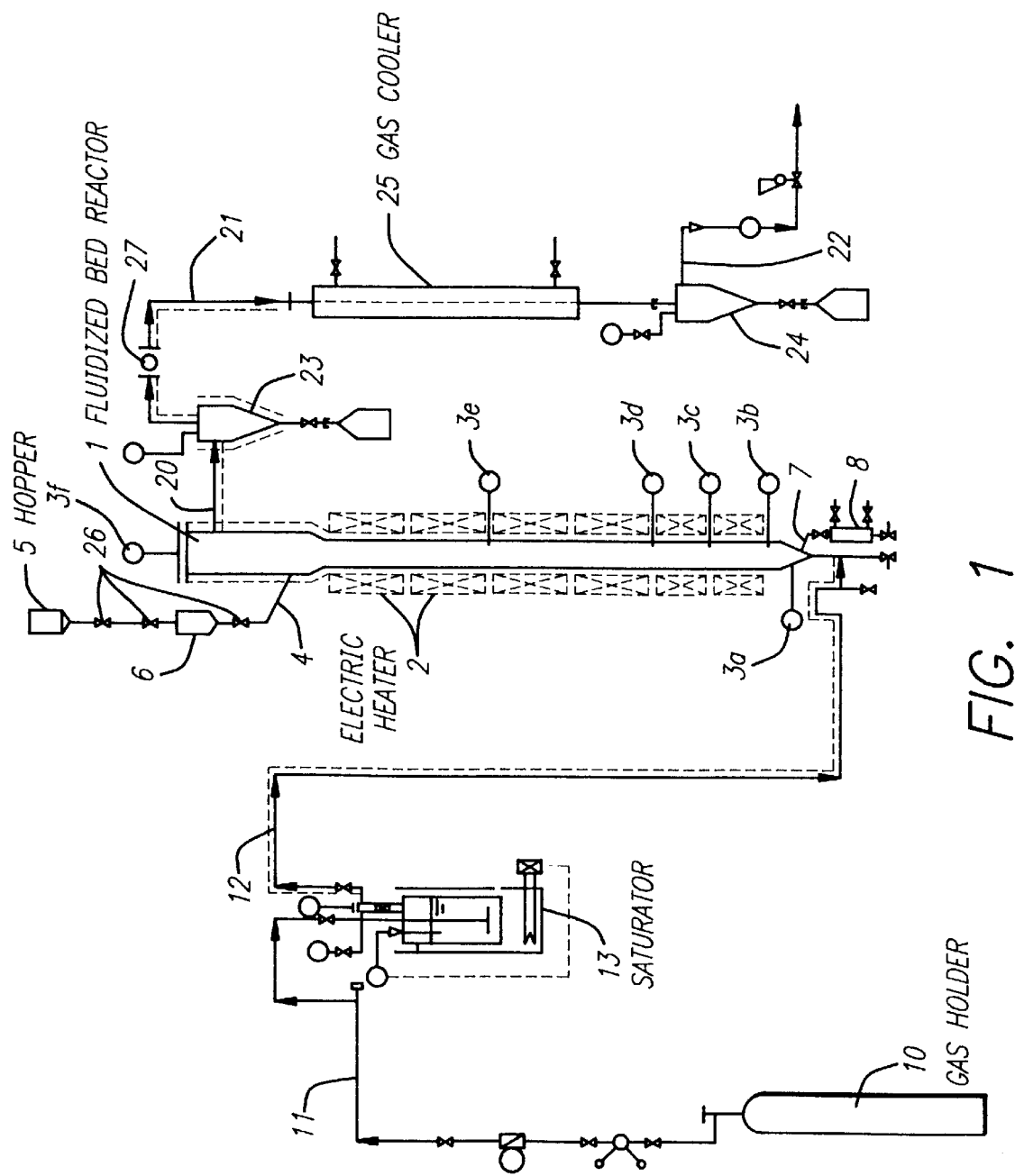
FIG. 1 is a schematic diagram illustrating an experimental apparatus for practicing the method of producing iron carbide according to one embodiment of the present invention.

One embodiment of an experimental apparatus for practicing a method of producing iron carbide of the present invention comprises a fluidized bed reactor 1 and peripheral apparatus therefor, as shown in the schematic diagram of FIG. 1. Fluidized bed reactor 1 generally has a cylindrical shape and is provided with a heating means 2, such as an electric heater, to provide a predetermined temperature. In this embodiment, a pipe having nominal diameter of 50 mm was used as the principal part of fluidized bed reactor 1. In addition, temperature-detecting sensors 3a, 3b, 3c, 3d, 3e, and 3f were positioned along the length of fluidized bed reactor 1, at 127 mm, 187 mm, 442 mm, 697 mm, and 1707 mm from the bottom of fluidized bed reactor 1, and at the top of fluidized bed reactor 1, respectively, in order to measure the temperature of the interior of reactor 1.

A hopper 5 was connected to the upper peripheral portion of fluidized bed reactor 1 by a line 4 via a lock hopper 6 and a plurality of valves 26 to permit flow of a fine-sized feed (e.g., hematite ($Fe_2O_3$)), in a pressurized state, from hopper 5 into fluidized-bed reactor 1. In addition, a cooler 8 was operatively connected to the bottom peripheral portion of fluidized bed reactor 1 via a line 7 to sufficiently cool material discharged from the interior of reactor 1.

The bottom of fluidized bed reactor 1 was connected to a gas holder 10 via lines 11 and 12 to allow flow of a reaction gas of predetermined composition in gas holder 10 into fluidized bed reactor 1. Further, a saturator 13 is operatively positioned between lines 11, 12 to saturate the reaction gas with water.

Lines 20, 21, and 22 were connected in series to one another, and line 20 was connected to the upper peripheral portion of fluidized bed reactor 1 to direct an exhaust gas from the reaction to an incinerator apparatus (not shown). In addition, raw material dust contained in the exhaust gas can be removed using a dust collector 23 operatively positioned between lines 20, 21 and a filter 27 inserted into line 21. Line 21 further was provided with a gas cooler 25 for cooling the exhaust gas to condense water, which is separated in a drain separator 24 operatively positioned between lines 21 and 22.

2. Experimental Conditions and Results

A. First, a single operation, that is, a conventional process of subjecting an iron ore containing mainly hematite (i.e., $Fe_2O_3$) to a catalytic reaction using a mixed gas containing a reducing gas and a carburizing gas to convert the iron ore into iron carbide ($Fe_3C$) was performed. The experimental conditions were:

The iron ore used for the experiment had a composition of Fe (65.3% by weight), $Al_2O_3$ (1.67% by weight), $SiO_2$ (3.02% by weight), and P (0.080% by weight). The iron ore (3.52 kg) was charged into fluidized bed reactor 1 after sizing into a particle size of not more than 1.0 mm (i.e., amount of the fine-sized iron ore having the particle size of 1.0 to 0.1 mm was not less than 80% by weight and the particle size of not more than 0.068 mm was 13.4% by weight). The composition of the reaction gas was as follows:

$CO+CO_2$: about 5%, $CO_2+H_2O \leq$ about 4%, $H_2+CH_4$: about 85% ($CH_4>H_2$), $N_2 \leq$ about 8%.

Then, the reaction gas was allowed to flow into fluidized bed reactor 1 at a flow rate of 2.15 $Nm^3$/hour. The temperature and pressure in fluidized bed reactor 1 were maintained 590° C. and 3 $kgf/cm^2$ G, respectively. The data using these experimental conditions of temperature and pressure are summarized in detail in Table 1.

TABLE 1

| Time (hr.) | Temperature (°C.) (from the bottom of reactor) | | | | | | Pressure |
|---|---|---|---|---|---|---|---|
| Elapsed | 127 mm | 187 mm | 442 mm | 697 mm | 1707 mm | Free Board | (kgf/cm²G) |
| 0.0 | 513 | 517 | 534 | 536 | 526 | 507 | 3.0 |
| 0.5 | 214 | 252 | 579 | 578 | 555 | 518 | 3.0 |
| 1.0 | 199 | 232 | 577 | 583 | 562 | 528 | 3.0 |
| 1.5 | 199 | 223 | 590 | 589 | 574 | 550 | 3.0 |
| 2.0 | 202 | 217 | 594 | 596 | 578 | 552 | 3.0 |
| 2.5 | 204 | 220 | 595 | 597 | 583 | 556 | 3.0 |
| 3.0 | 204 | 220 | 592 | 595 | 585 | 561 | 3.0 |
| 3.5 | 206 | 225 | 597 | 600 | 583 | 562 | 3.0 |
| 4.0 | 205 | 223 | 598 | 599 | 584 | 563 | 3.0 |
| 4.5 | 208 | 227 | 603 | 604 | 583 | 563 | |
| 5.0 | 205 | 223 | 599 | 599 | 583 | 564 | |
| 5.5 | 207 | 235 | 612 | 615 | 585 | 564 | |
| 6.0 | 199 | 220 | 607 | 608 | 582 | 565 | |
| 6.5 | 206 | 232 | 607 | 607 | 580 | 566 | |
| 7.0 | 205 | 233 | 609 | 609 | 580 | 566 | |
| 7.5 | 208 | 235 | 607 | 608 | 579 | 566 | 2.5 |
| 8.0 | 205 | 231 | 601 | 603 | 581 | 565 | |
| 8.5 | 312 | 578 | 595 | 595 | 582 | 564 | |
| 9.0 | 559 | 566 | 591 | 594 | 581 | 564 | 2.9 |
| 9.5 | 568 | 577 | 600 | 600 | 581 | 564 | 3.0 |
| 10.0 | 549 | 557 | 586 | 593 | 581 | 564 | 3.1 |
| 10.5 | 560 | 571 | 599 | 603 | 581 | 564 | |
| 11.0 | 559 | 569 | 598 | 600 | 580 | 564 | |
| 11.5 | 561 | 571 | 597 | 600 | 583 | 564 | |
| 12.0 | 560 | 570 | 599 | 600 | 583 | 565 | |
| 12.5 | 556 | 568 | 597 | 599 | 583 | 565 | |
| 13.0 | 564 | 575 | 605 | 603 | 583 | 566 | |
| 13.5 | 563 | 574 | 601 | 601 | 582 | 566 | |
| 14.0 | 551 | 563 | 583 | 587 | 580 | 566 | |
| 14.5 | 556 | 570 | 600 | 599 | 581 | 566 | |
| 15.0 | 557 | 568 | 601 | 601 | 581 | 567 | |
| 15.5 | 555 | 571 | 603 | 602 | 580 | 566 | |
| 16.0 | 547 | 562 | 597 | 598 | 578 | 566 | |
| 16.5 | 542 | 561 | 597 | 598 | 579 | 566 | |
| 17.0 | 215 | 262 | 608 | 610 | 579 | 564 | |
| 17.5 | 198 | 229 | 599 | 601 | 581 | 563 | |
| 18.0 | 205 | 228 | 592 | 593 | 579 | 561 | |
| 18.5 | 205 | 227 | 590 | 591 | 578 | 558 | |
| 19.0 | 207 | 230 | 589 | 591 | 578 | 556 | |
| 19.5 | 205 | 227 | 590 | 591 | 583 | 556 | |
| 20.0 | 204 | 227 | 590 | 592 | 584 | 556 | |

Figure 17:
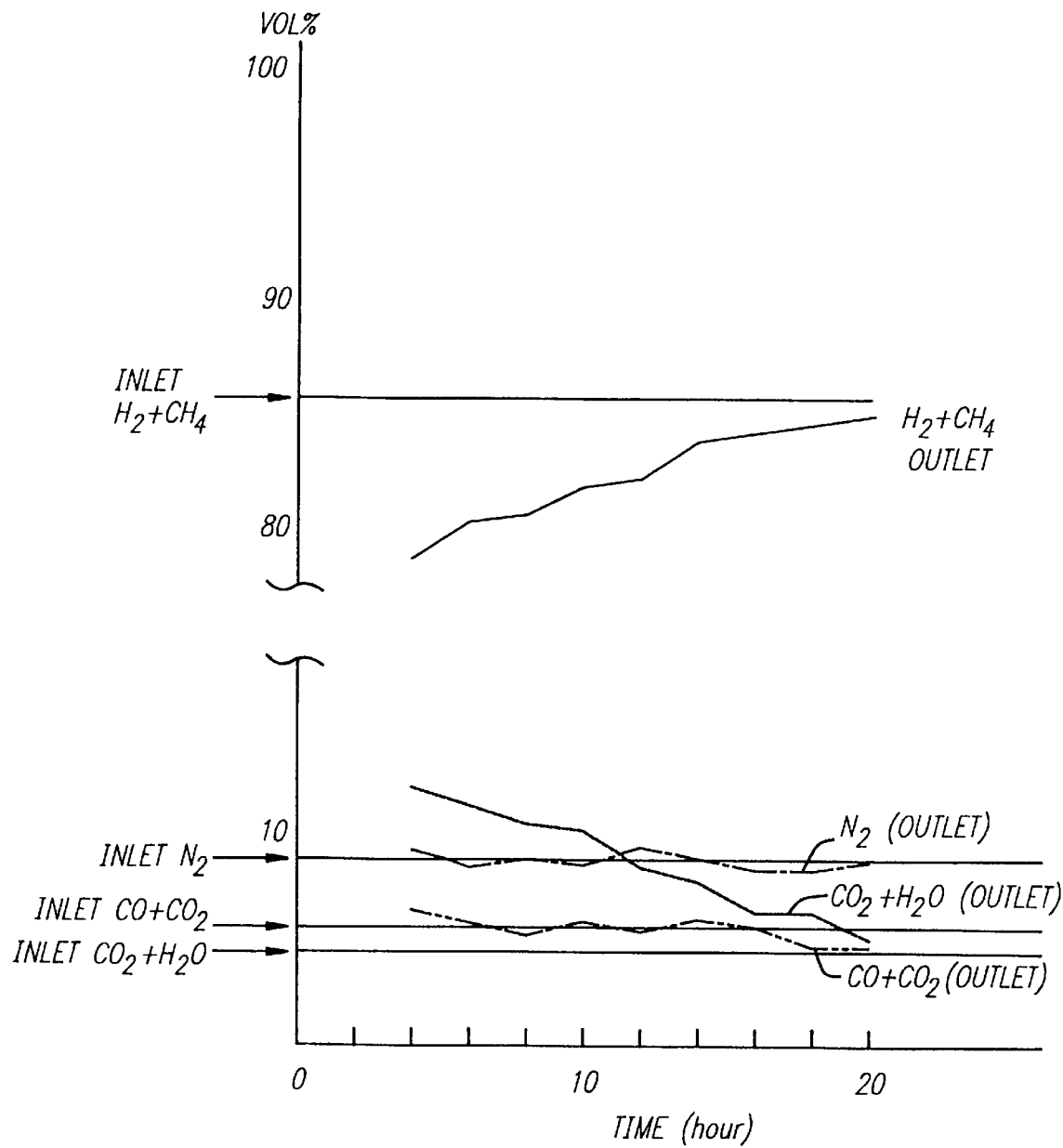
FIG. 17 is a graph with respect to Table 1, illustrating a change in outlet gas composition after reaction of the inlet gas composition.

Table 1 includes the temperature (temperature columns in Table 1) and pressure (pressure column in Table 1) which were measured every 30 minutes after onset of the reaction. The columns headed 127 mm, 187 mm, 442 mm, 697 mm, 1707 mm, and free board in the temperature columns are the temperatures detected by temperature-detecting sensors 3a, 3b, 3c, 3d, 3e, and 3f of FIG. 1, respectively. An outlet gas composition resulting from a reaction utilizing the inlet gas composition is shown in FIG. 17. This gas composition was detected by a mass spectrometer, and inspected several times by gas chromatography.

The temperature in fluidized bed reactor 1 was maintained at 600° C. The data obtained using these experimental conditions are summarized in detail in Table 2, which is similar to above-described Table 1.

TABLE 2

| Time (hr.) | Temperature (°C.) (from the bottom of reactor) | | | | | Pressure |
|---|---|---|---|---|---|---|
| Elapsed | 127 mm | 187 mm | 442 mm | 697 mm | 1707 mm | Free Board | (kgf/cm²G) |
| 0.0 | 581 | 583 | 593 | 604 | 590 | 602 |
| 0.5 | 576 | 581 | 596 | 604 | 603 | 583 |
| 1.0 | 583 | 590 | 601 | 607 | 608 | 576 |
| 1.5 | 589 | 594 | 603 | 606 | 591 | 555 |
| 2.0 | 592 | 599 | 604 | 608 | 602 | 571 |
| 2.5 | 594 | 601 | 606 | 608 | 608 | 571 |
| 3.0 | 587 | 592 | 605 | 609 | 614 | 568 |
| 3.5 | 590 | 595 | 606 | 608 | 599 | 566 |
| 4.0 | 591 | 598 | 607 | 610 | 599 | 559 |
| 4.5 | 590 | 596 | 606 | 609 | 608 | 562 |
| 5.0 | 590 | 598 | 607 | 609 | 601 | 560 |
| 5.5 | 586 | 595 | 606 | 609 | 607 | 561 |
| 6.0 | 591 | 597 | 606 | 610 | 599 | 564 |
| 6.5 | 588 | 592 | 605 | 609 | 603 | 567 |
| 7.0 | 589 | 596 | 605 | 610 | 597 | 568 |
| 7.5 | 580 | 587 | 607 | 610 | 598 | 569 |
| 8.0 | 589 | 596 | 607 | 610 | 587 | 563 |
| 8.5 | 579 | 587 | 611 | 613 | 594 | 570 |

Figure 2:
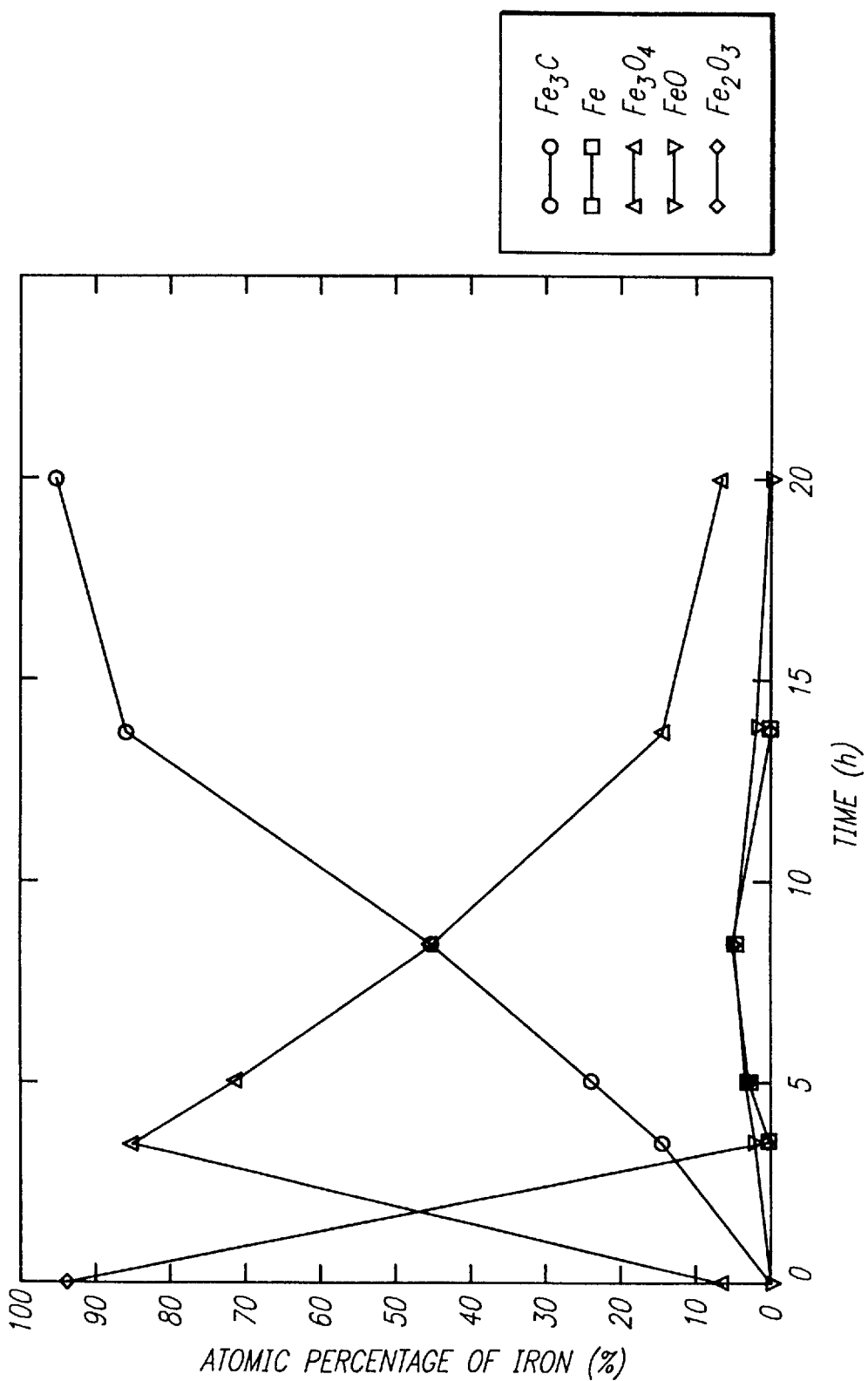
FIG. 2 is a graph plotting a relationship between the composition ratio of raw material (feed) and time from the results of experiment (A) carried out using the testing apparatus of FIG. 1.

The experimental results obtained under the above-described conditions are shown in FIG. 2. The abscissa and ordinate of the graph plotted in FIG. 2 respectively set forth time (in hours) and an atomic ratio of iron (for example, $Fe_3C$: 90% means that 90% of the total iron atoms exist as $Fe_3C$). It is apparent from FIG. 2 that about 20 hours are required for the conversion ratio to $Fe_3C$ to attain 93 atom %, which is sufficient for an iron carbide product ($Fe_3C$).

B. A method step of subjecting a raw material to a catalytic reaction using a reducing gas (hereinafter referred to as a first stage of a reaction process), and then a method step of subjecting the reaction product of the first stage to a catalytic reaction using a gas mixture containing reducing and carburizing gases (hereinafter referred to as a second stage of the reaction process) were conducted in an experiment converting iron ore into iron carbide. In other words, experiment was divided into a partial reducing reaction and the remaining reducing and a carburizing reaction in accordance with the present invention. The experimental conditions are described in detail hereafter.

The composition and amount of iron ore charged into fluidized bed reactor 1, the flow rate of the reaction gas, and the pressure in fluidized bed reactor 1 were identical to those of the above experiment (A), but the composition of the reaction gas and temperature in fluidized bed reactor 1 were varied. That is, the composition of the reaction gas of the first stage of the reaction process, which was conducted for 3 hours from the onset of the reaction, was as follows:

$H_2$: about 74%, $N_2$: about 25%.

Three hours after beginning the first stage of the reaction process, the gas composition used in the second stage of the reaction process was as follows:

$CO+H_2O$: about 6%, $CO_2+H_2O \leq$ about 3.5% ($H_2O \leq 1.5\%$), $H_2+CH_4$: 80 to 85% ($CH_4>H_2$), $N_2 \leq 10\%$.

Figure 18:
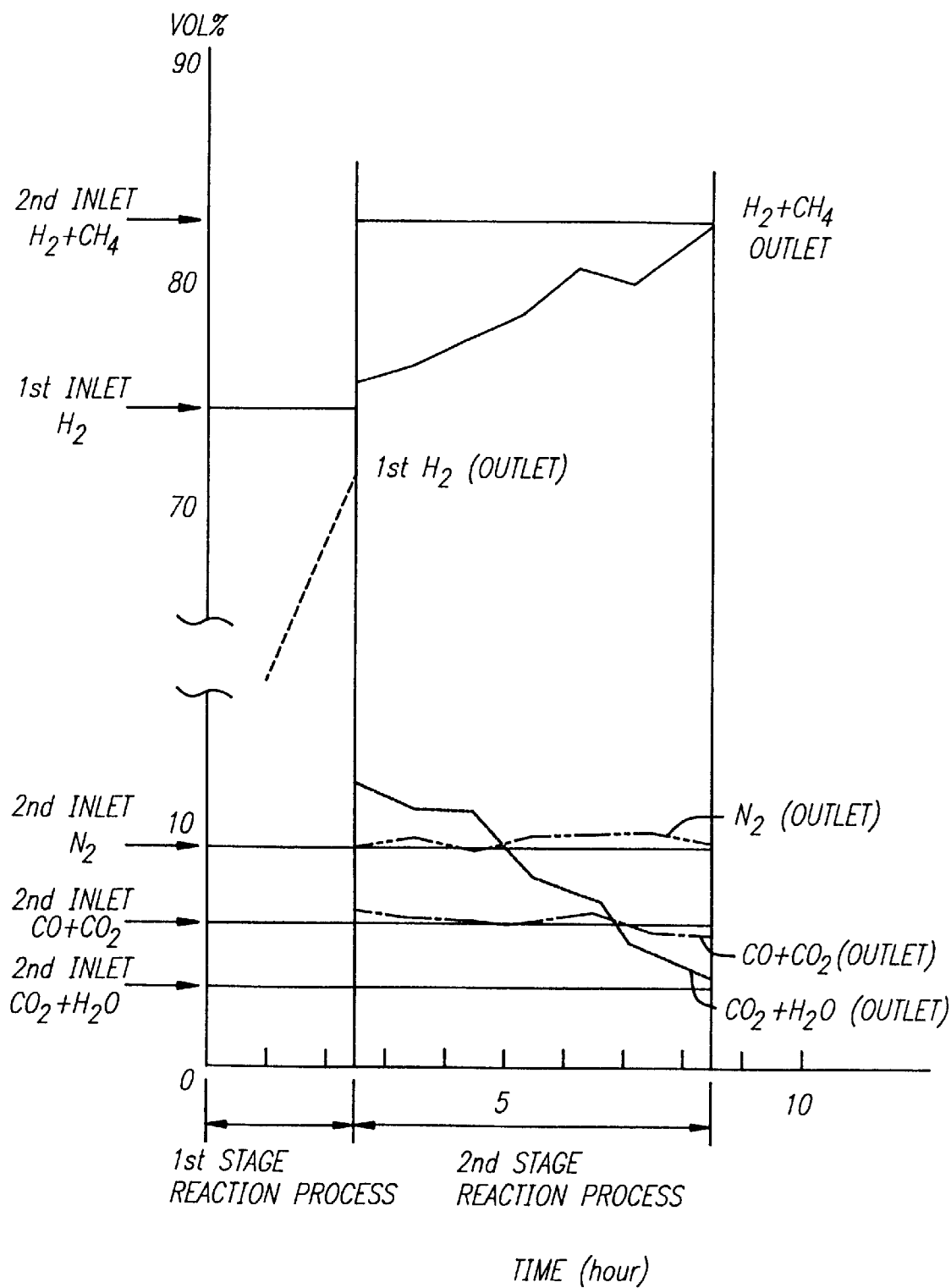
FIG. 18 is a graph with respect to Table 2, illustrating a change in outlet gas composition after reaction of the inlet gas composition.

An outlet gas composition resulting from a reaction utilizing the inlet gas composition is shown in FIG. 18. Hydrogen primarily was consumed in the first stage of the reaction process, and methane primarily was consumed in the second stage of the reaction process to obtain the results which are similar to formula (7) as the overall reaction formula.

Figure 3:
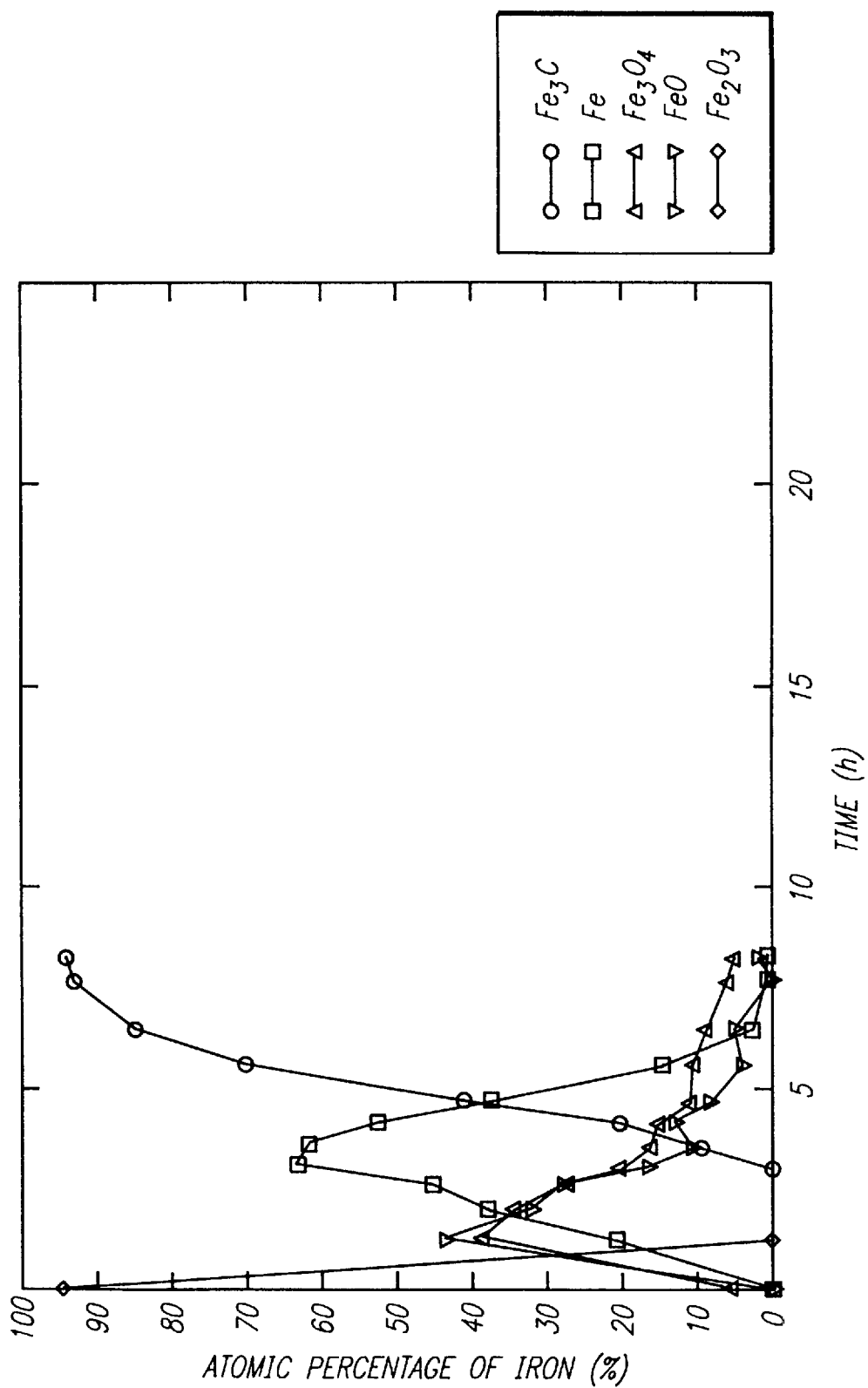
FIG. 3 is a graph plotting a relationship between the composition ratio of raw material (feed) and time from the results of experiment (B) carried out using the testing apparatus of FIG. 1.

The experimental results obtained using the above conditions are summarized in FIG. 3 which is similar to FIG. 2. It is apparent from the graph in FIG. 3 that about 7.5 hours are required for the conversion ratio to $Fe_3C$ to reach 93 atom %, which is suitable for an iron carbide product ($Fe_3C$), and the reaction time is substantially shortened compared to the above experiment (A). The reason is that the process is divided into two stages, i.e., a portion of the reducing reaction of iron ore in a first stage, and the remaining reducing reaction and a carburizing reaction in a second stage. Therefore, taking only the reducing reaction into consideration, the concentration of hydrogen can be increased in the first stage of the reaction process. The reduction ratio of the respective stages are not extremely large, and, therefore, no sintering arises and the reaction temperature can be increased to about 600° C.

C. Finally, an experiment was conducted in the same manner as that described in above experiment (B), except for varying the reaction temperature and pressure. The experimental conditions are explained hereafter.

The composition and amount of iron ore charged into fluidized bed reactor 1, and the flow rate of the reaction gas were identical to above experiment (B). The first stage of the reaction process was conducted for 1.5 hours after the onset of the reaction using a reaction gas having a composition as follows:

$H_2$: about 70%, $(N_2+CH_4)$: about 30%.

One and one-half hours after beginning the reaction, the composition of the reaction gas for the second stage of the reaction process was adjusted as follows:

$CO+C_2O$: about 7%, $CO_2+H_2O \leq 4.0\%$ ($H_2O \leq 1.5\%$), $H_2+CH_4$: 80 to 85%, $N_2 \leq 10\%$.

The temperature and pressure in fluidized bed reactor 1 were maintained at 650° C. and 5 atm, respectively.

Figure 4:
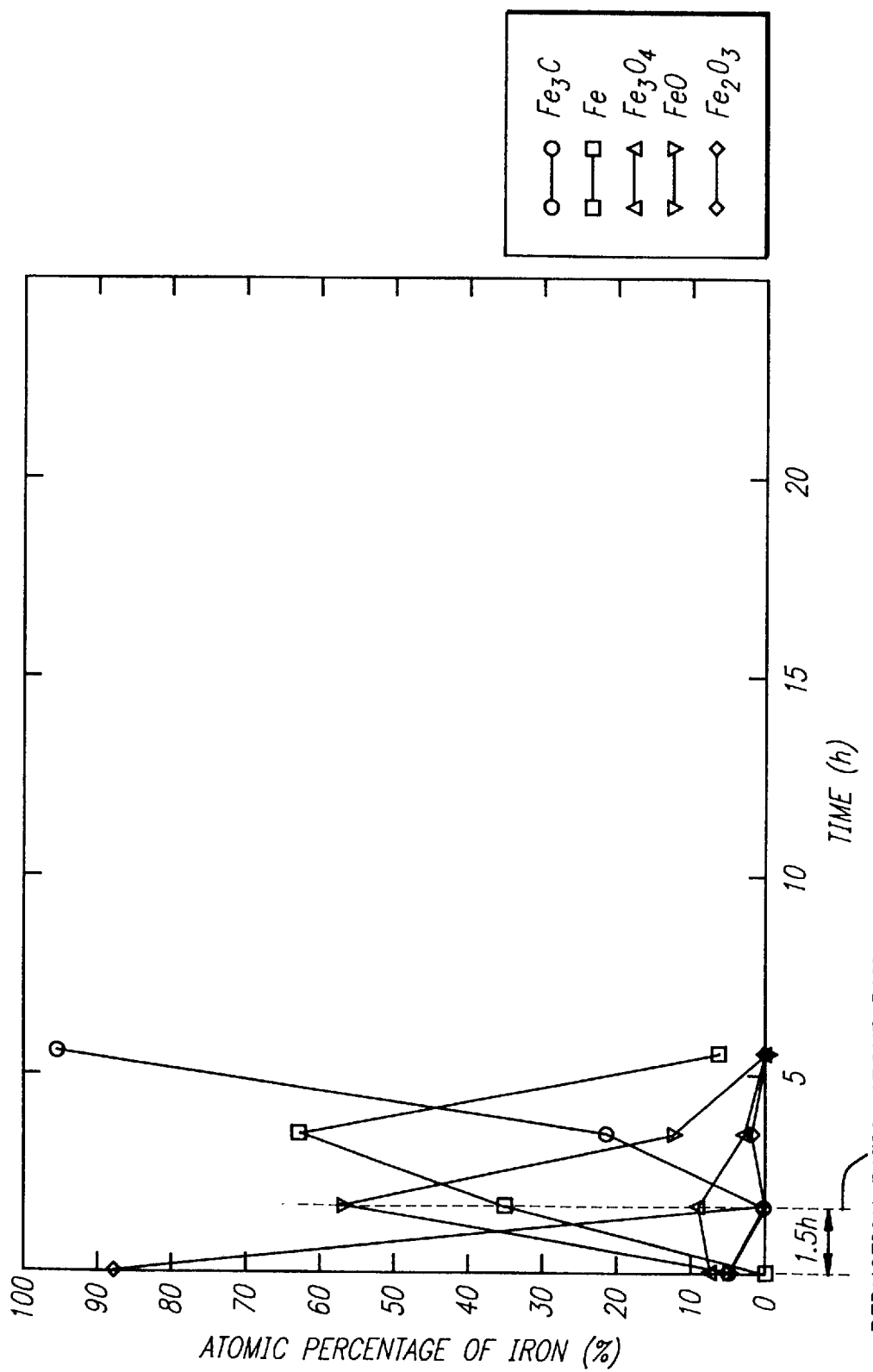
FIG. 4 is a graph plotting a relationship between the composition ratio of raw material (feed) and time from the results of experiment (C) carried out using the testing apparatus of FIG. 1.

The experimental results obtained under the above conditions are plotted in FIG. 4, which is similar to FIGS. 2 and 3. It is apparent from FIG. 4 that about 5.5 hours were required for the conversion ratio to $Fe_3C$ to reach 93 atom %, which is suitable for an iron carbide product ($Fe_3C$), and that the reaction time can be substantially shortened compared to the above experiment (A), and is similar to the above experiment (B). The generation rate of iron carbide did not decrease at the latter part of the reaction because the reaction temperature was increased.

EMBODIMENT

3. An Apparatus for Producing Iron Carbide

A large-scale apparatus capable of performing a continuous conversion is required in order to economically produce an iron-containing material, which contains iron carbide as a main component, for iron making in blast furnaces, cupolas, etc., and for steel making in converters, electric furnaces, etc. One embodiment of an apparatus for producing iron carbide according to the present invention is set forth in the schematic diagram of FIG. 5.

Figure 5:
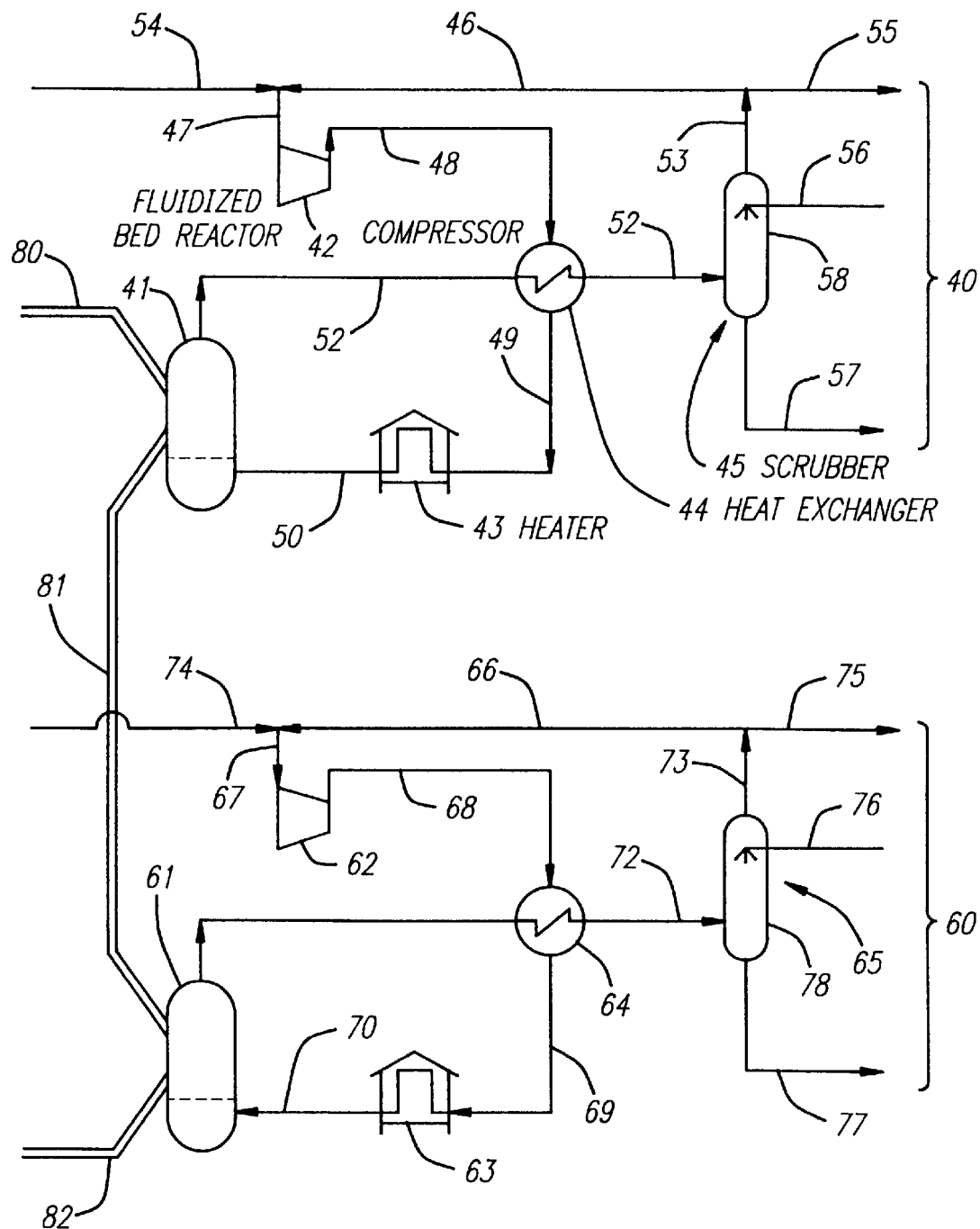
FIG. 5 is a schematic diagram illustrating a production apparatus for practicing the method for producing iron carbide according to one embodiment of the present invention.

As shown in FIG. 5, the apparatus of this embodiment comprises a first-stage reaction process portion, referred to as a first-stage gas circulating loop 40, for conducting a partial reducing reaction of an iron ore containing mainly hematite as the iron-containing raw material for iron making and a second-stage reaction process portion, referred to as a second-stage gas circulating loop 60, for conducting the remaining reducing reaction and a carburizing reaction. With respect to flow through first-stage circulating loop 40, lines 46 and 47, compressor 42, line 48, heat exchanger 44, line 49, heater 43, line 50, fluidized bed reactor 41, line 51, heat exchanger 44, line 52, scrubber 45, and line 53 form first loop 40. That is, a reaction gas is introduced near the bottom of fluidized bed reactor 41, such as through a gas inlet, via line 47, compressor 42, line 48, heat exchanger 44, line 49, heater 43, and line 50 in order. The reaction gas exits from near the top of fluidized bed reactor 41 through line 51, heat exchanger 44, line 52, scrubber 45, line 53, line 46, and line 47 to form a loop for circulating the first reaction gas. The reaction gas flowing from the bottom to the top of fluidized bed reactor 41 is circulated by compressor 42. Gas flowing into fluidized bed reactor 41 is subjected to heat exchange in heat exchanger 44 with gas flowing from reactor 41 after the completion of the reaction, and then is heated by gas heater 43. Scrubber 45 comprises a hollow body 58, a line 56 for spraying water onto the gas, and a line 57 for discharging water from body 58. Gas flowing from reactor 41 is cooled, and steam present in the gas is condensed for removal. Furthermore, a gas having a predetermined composition can be supplied to loop 40 through a line 54 connected at a conjunction between lines 46 and 47, and a predetermined amount of gas can be withdrawn from loop 40 through a line 55 connected at a conjunction between lines 53 and 46. The feed gas and discharge gas are adjusted to maintain a constant composition of reaction gas flowing into fluidized bed reactor 41, thereby preventing a change in gas composition and a decrease in reaction speed.

In addition, the flow of a second reaction gas through second-stage gas circulating loop 60 is identical to the flow of the first reaction gas through loop 40 as shown in FIG. 5, wherein reference numbers for second loop 60 are obtained by adding 20 to the reference number of corresponding elements in first loop 40. An explanation of the elements, and their function, of second loop 60 is set forth above with respect to first loop 40.

Regarding the flow of raw material feed in the reactor, a fine-sized iron ore is continuously supplied to the upper portion of fluidized bed reactor 41 of first-stage gas circulating loop 40 via a charging route comprising line 80, and the raw material feed which has already been subjected to a partial reducing reaction in reactor 41 is allowed to flow continuously from the bottom portion of fluidized bed reactor 41 to fluidized bed reactor 61 of second-stage gas circulating loop 60 via a supply route comprising a line 81. The remaining reducing reaction and the carburization reaction are performed in fluidized bed reactor 61 and the converted iron carbide is continuously discharged through a recovering route comprising a line 82.

Regarding the gas composition used in the respective first and second stages, the first stage of the reaction process is performed using a reducing gas containing mainly hydrogen because only the reducing operation is occurring. The concentration of hydrogen is high to increase the reaction speed of the reducing reaction, thereby making it possible to shorten the reaction time in comparison with a conventional method. The second stage of the reaction process is performed using a gas mixture containing hydrogen and methane because both reducing and carburizing reactions are occurring. However, the reducing reaction was partially performed in the first stage of the reaction process, and, therefore, the carburizing reaction can be considered as more important. Accordingly, the concentration of methane gas can be increased in order to increase the reaction speed of the carburizing reaction, thereby making it possible to shorten the reaction time. A predetermined amount of methane gas can be added to the reducing gas containing mainly hydrogen of the first stage of the reaction process to decrease the concentration of hydrogen, thereby making it possible to control the speed of the reduction reaction. On the other hand, the speed of the carburization reaction can be controlled by adjusting the concentration of methane in the second stage of the reaction process, thereby making it possible to control reaction time with little generation of free carbon and a predetermined desired carburization ratio.

In the apparatus for producing iron carbide of this embodiment, the reduction degree of hematite in the first stage of the reaction process was in the range of 50% to 65 atom % of total iron atoms. Thereby, the amount of hydrogen required for the reducing reaction in the second reaction is identical to the amount generated in the carburizing reaction. Therefore, only methane gas can be supplied as the reaction gas of the second stage of the reaction process. The reason is that, as is apparent from the above formulas (1) to (4), a ratio of hydrogen required for the reducing reaction to that generated in the carburizing reaction is 9:4 when the iron (Fe) content is constant. Therefore, it is possible to meet the demand and supply of hydrogen gas in the second stage of the reaction process by respectively adjusting the reduction degree in the first and second stages of the reaction process to about 56 atom % and the remaining 44 atom %, stoichiometrically. The gas composition used when the apparatus is operated under the above conditions is set forth in Table 3.

TABLE 3

|  | 1st Stage. 4 ATM 590° C. | | | | 2nd Stage, 4 ATM 590° C. | | | |
| --- | --- | --- | --- | --- | --- | --- | --- | --- |
|  | Make-up Gas | Reactor Inlet | Reactor Outlet | Bleed Gas | Make-up Gas | Reactor Inlet | Reactor Outlet | Bleed Gas |
| % CO + $CO_2$ | 0.20 | 2.06 | 2.11 | 2.68 | 0.47 | 2.88 | 2.84 | 3.01 |
| % $CO_2$ + $H_2$ | 1.60 | 2.03 | 23.16 | 2.17 | 1.23 | 1.68 | 7.14 | 1.70 |
| % $H_2$ + $CH_4$ | 97.80 | 94.60 | 73.45 | 93.51 | 97.63 | 94.79 | 89.41 | 94.64 |
| % $N_2$ | 0.50 | 2.48 | 2.48 | 3.14 | 0.95 | 1.64 | 1.58 | 1.68 |
| NCM/T* | 411 | 1618 | 1619 | 61 | 200 | 3786 | 3916 | 103 |

The columns headed first and second stages in Table 3, respectively, indicate the first and second stages of the reaction process. The columns subheaded make-up gas, bleed gas, reactor inlet, and reactor outlet, respectively, indicate the composition of a gas supplied from lines 54 and 74 of FIG. 5 to first and second circulating loops 40 and 60, the composition of a gas removed through lines 55 and 75, the composition of a gas flowing into reactors 41 and 61, and the composition of a gas flowing out from reactors 41 and 61. The heading NCM/T* indicates the flow rate, in $Nm^3/t$, wherein N means a volume in normal state, of the reaction gas required per ton (weight in dry state) of raw material to be reacted. Further, the pressure and temperature in reactors 41 and 61 were respectively adjusted to 4 atm and 590° C. As described above, only hydrogen is consumed in the first stage of the reaction process and the amount of methane gas barely changes, and, therefore, only a reducing reaction proceeds. On the other hand, only methane gas is consumed in the second stage of the reaction process and the amount of the hydrogen gas does not change, and, therefore, hydrogen generated in the carburizing reaction is balanced by the hydrogen consumed in the reducing reaction. In order to increase the reaction speed of the carburizing reaction, and to shorten reaction time, the apparatus was operated by changing the reaction temperature and pressure of the first and second stages of the reaction process to 650° C. and 5 atm. The results are summarized in Table 4, which is similar to Table 3. The flow rate of the circulating gas in these two embodiments is substantially decreased in comparison to a conventional apparatus.

TABLE 4

|  | 1st Stage. 5 ATM 650° C. | | | | 2nd Stage, 5 ATM 650° C. | | | |
| --- | --- | --- | --- | --- | --- | --- | --- | --- |
|  | Make-up Gas | Reactor Inlet | Reactor Outlet | Bleed Gas | Make-up Gas | Reactor Inlet | Reactor Outlet | Bleed Gas |
| % CO + $CO_2$ | 0.30 | 1.96 | 1.93 | 2.27 | 2.59 | 6.59 | 6.35 | 6.77 |
| % $CO_2$ + $H_2$ | 0.20 | 1.58 | 16.50 | 1.83 | 3.49 | 2.91 | 9.07 | 2.87 |
| % $H_2$ + $CH_4$ | 99.05 | 90.96 | 76.05 | 89.42 | 94.52 | 86.77 | 80.90 | 86.41 |
| % $N_2$ | 0.49 | 6.19 | 6.20 | 7.29 | 1.99 | 5.61 | 5.42 | 5.79 |
| NCM/T* | 366 | 2278 | 2277 | 19 | 156 | 3433 | 3556 | 45 |

The energy consumed preparing an iron-carbide product having an $Fe_3C$ conversion ratio of 90 atom % or greater is produced by an apparatus having a production scale of 500,000 tons per year, and using natural gas, is calculated based on the above results. The calculations are tabulated in Table 8b. The amount of energy consumed in a conventional process for producing direct reduced iron or iron carbide is described in publication 10 and is tabulated in Table 8a. It has been found that a similar or remarkably improved result is obtained by the present invention.

TABLES 8a-8b

Table 8a

| Process | WIDREX | HYL III | FIOR | AREX | FIORII | Prior art of IRON CARBIDE Process | Table 8b The Present Invention |
|---|---|---|---|---|---|---|---|
| Pressure | Atmospheric | 5 bars | 10 bars | Atmospheric | 10 bars | | 3–6 bars |
| Typical Plant Capacity (mmt/y*) | 1 | 1 | 0.4 | 0.5 | 1 | 0.32 | 0.5 |
| Energy Input (Gcal/Wt) | 2.5 | 2.7 | 4.0 | | | 3.0 | 2.7 |
| Natural Gas (G/mt) | 10 | 10.9 | 18 | 8.7 | 13 | 13 | 11.5 |
| Elect. (kWh/mt) | 125 | 85 | 200 | 70 | 150 | 230 | 130 |
| Product Metallization | >92% | >92% | 93% | 93% | 93% | $Fe_aC > 90\%$ | $Fe_aC > 90\%$ |
| Product Carbon Content | 1–2% | 1–4% | 0.5% | 2% | 1.5% | <6% ($Fe_aC$) | <6% ($Fe_aC$) |

*mmt/y = million metric tons per year
Table 8a From publication 10
Table 8b Process example for industrial plant (scale 500,000 tons/year) according to the present invention and calculated from the above test results

4. Method for Producing Iron Carbide (a) The conversion ratio from hematite to iron carbide is in the range of 90 to 99 atom %, preferably 93 atom % or more, and more preferably 95 atom % or more. The higher the conversion ratio, the greater the value of the $Fe_3C$ product.

(b) The reaction temperature of the first stage of the reaction process is in the range of 550° to 750° C., preferably 600° to 750° C. As described above, the reduction degree is not carried to a high value in the first stage of the reaction process of the present invention, and, therefore, sintering does not arise and it is possible to operate at 600° C. or more. Accordingly, the reaction temperature preferably is raised to increase the reaction speed.

Figure 9:
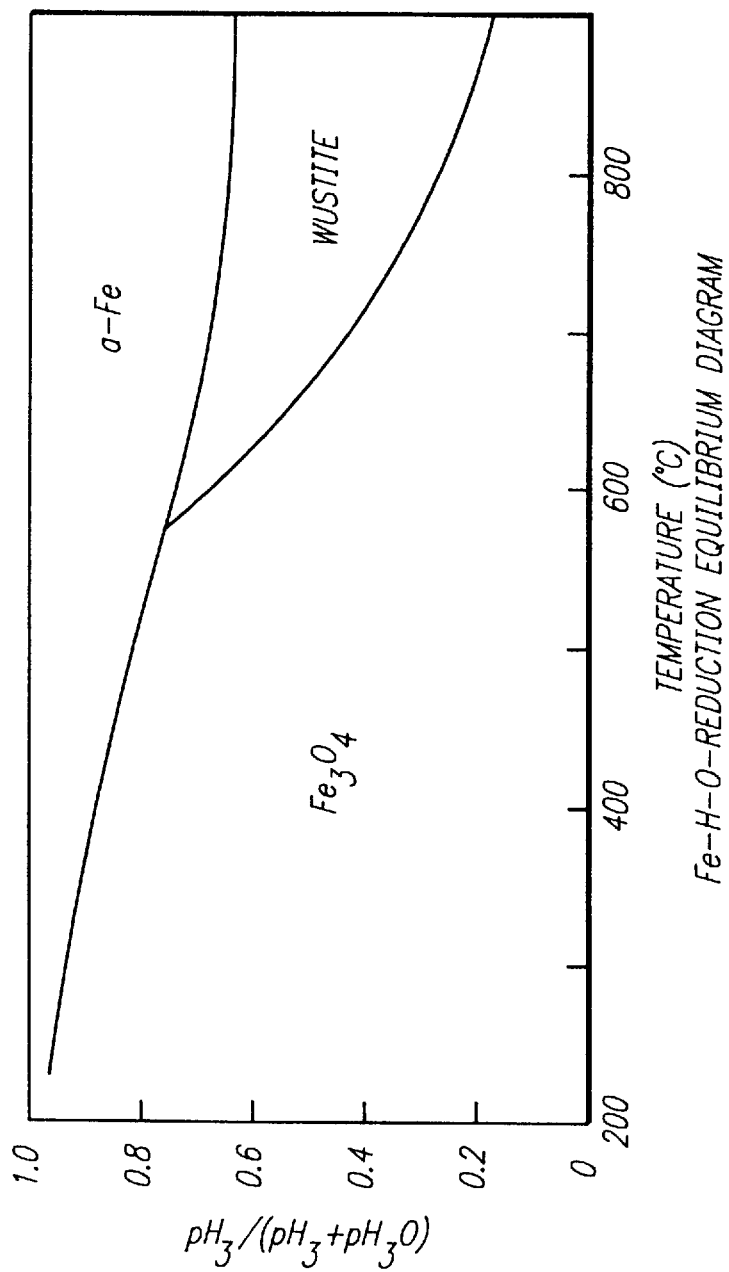
FIG. 9 is an equilibrium diagram of an Fe—H—O system.

(c) The reaction temperature of the second stage of the reaction process is in the range of 550° to 750° C., preferably 590° to 750° C. As soon as the reducing reaction is completed in the second stage of the reaction process, the carburizing reaction then proceeds. Therefore, no sintering occurs at a reaction temperature of 600° to 700° C., and the carburizing reaction can be performed. Accordingly, the reaction temperature preferably is increased to increase the reaction speed of reduction and carburization. Furthermore, as shown in FIG. 9, when the reaction temperature is increased to 590° C. or more, the region where magnetite ($Fe_3O_4$) exists becomes narrow and region where FeO exists becomes wide in the Fe—H—O system reduction equilibrium. The presence of magnetite decreases the speed of conversion into iron carbide at the final stage of the carburizing reaction. Therefore, the reaction time is shortened by narrowing the region where magnetite exists.

(d) The reaction pressure in the first and second stages of the reaction process is in the range of 1 to 9.9 $kgf/cm^2$ G, preferably 2 to 5 $kgf/cm^2$ G. When the pressure in fluidized bed reactors 41 and 61 is too low, it is difficult to fluidize the feed iron ore, and, therefore, the diameter of reactors 41 and 61 must be enlarged. The reaction speed also is reduced. On the other hand, when the reaction pressure is too high, it adversely affects the pressure-resistant strength of the body of reactors 41 and 61 and attendant valves, piping, etc.

(e) Fluidized bed reactors 41 and 61 shown in FIG. 5 are illustrated as a single reactor for simplifying the explanation. However, the reaction of the present invention is a catalytic reaction between a solid and gas, and the reaction degree is low. Therefore, in accordance with the present invention, a plurality of fluidized bed reactors 41 and 61 can be connected in series to carry out the reactions. Since the reaction speed of the respective reactions is high, the reaction can be sufficiently conducted using 1 to 4 reactors.

(f) The amount of steam in the reaction gas, which is rapidly generated at the beginning of the first stage of the reaction process, is reduced by condensing steam from the circulating gas with cooling (by scrubber 45 of FIG. 5) or by bleeding out a determined amount of steam per unit time. By reducing the amount of steam, the disadvantages of feed agglomeration due to condensation of steam, and failure of the feed to fluidize uniformly, can be prevented. Further, steam can be removed more efficiently by cooling the circulating gas to 10° to 25° C.

(g) Steam generated in the reaction gas in the second stage of the reaction process also is decreased by condensing water from the circulating gas with cooling (by scrubber 65 of FIG. 5). Reduction of the amount of steam in the reaction gas of the second stage of the reaction process has an advantageous effect described hereafter.

That is, as the partial pressure of steam in the reaction gas is reduced by removing steam, the Fe—H—O system equilibrium in the reducing reaction (see FIG. 9) shows that the partial pressure of hydrogen increases. Therefore, the region where magnetite exists, which causes a reduction in the speed of conversion to iron carbide as described above, becomes narrow, while the region where Fe and FeO exist becomes wide, which leads to shortened reaction time. It is particularly preferable that the concentration of steam in the gas used for conducting the second stage of the reaction process is decreased to a range that can be controlled industrially. Accordingly, the concentration of $H_2O$ preferably is adjusted to not more than 1.5%.

On the other hand, when no steam is present in a gas used in the second stage of the reaction process, free carbon is generated according to the following reactions.

$$CH_4 \rightarrow C + 2H_2 \tag{15}$$

$$CO + H_2 \rightarrow C + H_2O \tag{16}$$

Therefore, when the pressure is increased, or the amount of steam is increased, the generation of free carbon due to the reactions of formulas (15) and (16) can be reduced. Accordingly, the concentration of steam has a lower limit, and the concentration of $H_2O$ is adjusted to not less than 0.2% in a normal operation. When free carbon is generated, steam can be added to prevent the generation of free carbon.

(h) In the first stage of the reaction process, for example, $CO_2$ gas is removed using a $CO_2$ scrubber (e.g., by utilizing a gas absorption process with solvent), which results in a decreased concentration of CO and $CO_2$ which are in a chemical equilibrium relation. The decrease in CO and $CO_2$ concentration decreases the concentration of methane in a chemical equilibrium relation to prevent generation of free carbon, and further relatively increases the concentration of hydrogen gas to increase the reaction speed of the reduction.

(i) In the first and second stages of the reaction process, the raw material feed supplied to fluidized bed reactors 41 and 61 is preheated to a temperature ±100° C. of the reaction temperature. Therefore, agglomeration of the feed due to condensation of steam generated at the beginning of the reducing reaction, and failure to fluidize the feed, can be prevented. Since the reducing reaction is an endothermic reaction, steam has a tendency to condense. Because the reducing reaction in the second stage of the reaction process proceeds rapidly, such a disadvantage is particularly likely to occur. In addition to a preheating operation, a gas having a temperature which is decreased from the predetermined temperature by 10° to 100° C. can be used for the reaction at the beginning of the second stage of the reaction process in order to decrease the reaction speed, thereby making it possible to prevent generation of free carbon deposits and condensation of steam.

(j) The degree of the progress of the reducing reaction in the first stage of the reaction process, i.e., the reduction degree, can be determined by measuring the amount of steam present in the circulating gas. If the reduction degree can be determined, a variation in reaction time caused by variation in quality of the iron ore can be easily controlled.

(k) The reaction speed of the reducing reaction is controlled by adding a predetermined amount of methane to the make-up gas containing mainly hydrogen in the first stage of the reaction process. On the other hand, the reaction speed of the carburizing reaction can be controlled by adding a predetermined amount of hydrogen to the make-up gas containing mainly methane in the second stage of the reaction process. Therefore, the carburizing reaction having a high carbon activity can be controlled to prevent free carbon generation.

Further, the flow rate of methane and hydrogen, which are consumed in the first and second stages of the reaction process, is stoichiometrically determined by the amount of iron ore to be treated (referred to as ideal amount). Accordingly, as described above, the amount of methane added to the first stage of the reaction process preferably is subtracted from the ideal amount of methane required for the second stage of the reaction process, and the amount of hydrogen added in the second stage of reaction process preferably is subtracted from the ideal amount of hydrogen required for the first stage of the reaction process.

(l) A bleed gas exhausted from lines 55 and 75 in the first and second stages reaction process preferably is directed to an $H_2$ gas generating unit to recycle $H_2$ gas.

(m) When using heaters 43 and 63 shown in FIG. 5 as a combuster, the generated exhaust gases are utilized for preheating the feed for an effective use of energy.

(n) In the second stage of the reaction process, $CO_2+H_2$ can be added. Thereby, the concentration of CO and $CO_2$ in the circulating gas of the second phase of the reaction process preferably is increased by about 30 to 50%. The presence of CO and $CO_2$ can substantially increase the reaction speed of the carburizing reaction to achieve a substantial decrease in reaction time.

(o) The temperature of the raw material feed supplied to the reactors 41 and 61 is increased to a temperature higher than the preheating temperature described in the above item (i) (e.g., 50° to 150° C. above the said preheating temperature). On the other hand, the temperature of the circulating gas introduced into reactors 41 and 61 is decreased. The reactions can be performed when conducting such an operation. In addition, when such an operation is performed, damage to lines, such as lines 50 and 70 for the circulating gas, caused by the generation of free carbon or carburization of steel can be decreased.

(p) It is necessary to cool the iron carbide produced by the first and second stages of the reaction process because reaction activity of $Fe_3C$ is high at elevated temperatures. The iron carbide preferably is cooled rapidly to a temperature at which the reaction activity is low, such as by admixing with iron carbide which previously had been cooled to ambient temperate, followed by cooling the resulting mixture to ambient temperature. According to this process, iron carbide can be cooled readily.

In addition, rapid cooling of iron carbide preferably is conducted in a cooled process gas or an atmosphere of an inert gas, such as $N_2$, or under pressurized conditions. Thereby, conversion of iron carbide to other compounds is prevented.

In the apparatus shown in FIG. 5, when the partial reduction, or metallization %, in the first stage of the reaction process, e.g., value of x of $FeO_x$, shifts to a value different from, i.e., larger or smaller than, ⅔ according to the formula (11), i.e., relation of $FeO_{2/3}$ shown in Table 5, an excess or a lack of a reducing gas component, particularly hydrogen, arises in second phase gas circulating loop 60, while methane is synthesized according to the formula (13) in first phase gas circulating loop 40, which results in disadvantages, such as a decrease in reduction reaction speed due to accumulation of methane.

TABLE 5

Example of $FeO_{2/3}$ Composition

| Construction example | Coexistence of metal iron with wustite | Coexistence of metal iron with wustite and magnetite A ratio of the number of iron atoms in Wustite to those in Magnetite is 50:50 | Coexistence of metal iron with magnetite |
|---|---|---|---|
| Metal iron atoms (atom %) | 34 | 43 | 51 |
| Iron atoms as iron oxide (atom %) | 66 | 57 (Fe in FeO: 28.5 atom % Fe in $Fe_3O_4$: 28.5 atom %) | 49 |
| Reduction ratio in case of using hematite as starting material (%) | 56 | 56 | 56 |
| Metallization degree (%) | 34 | 43 | 51 |

Figure 16:
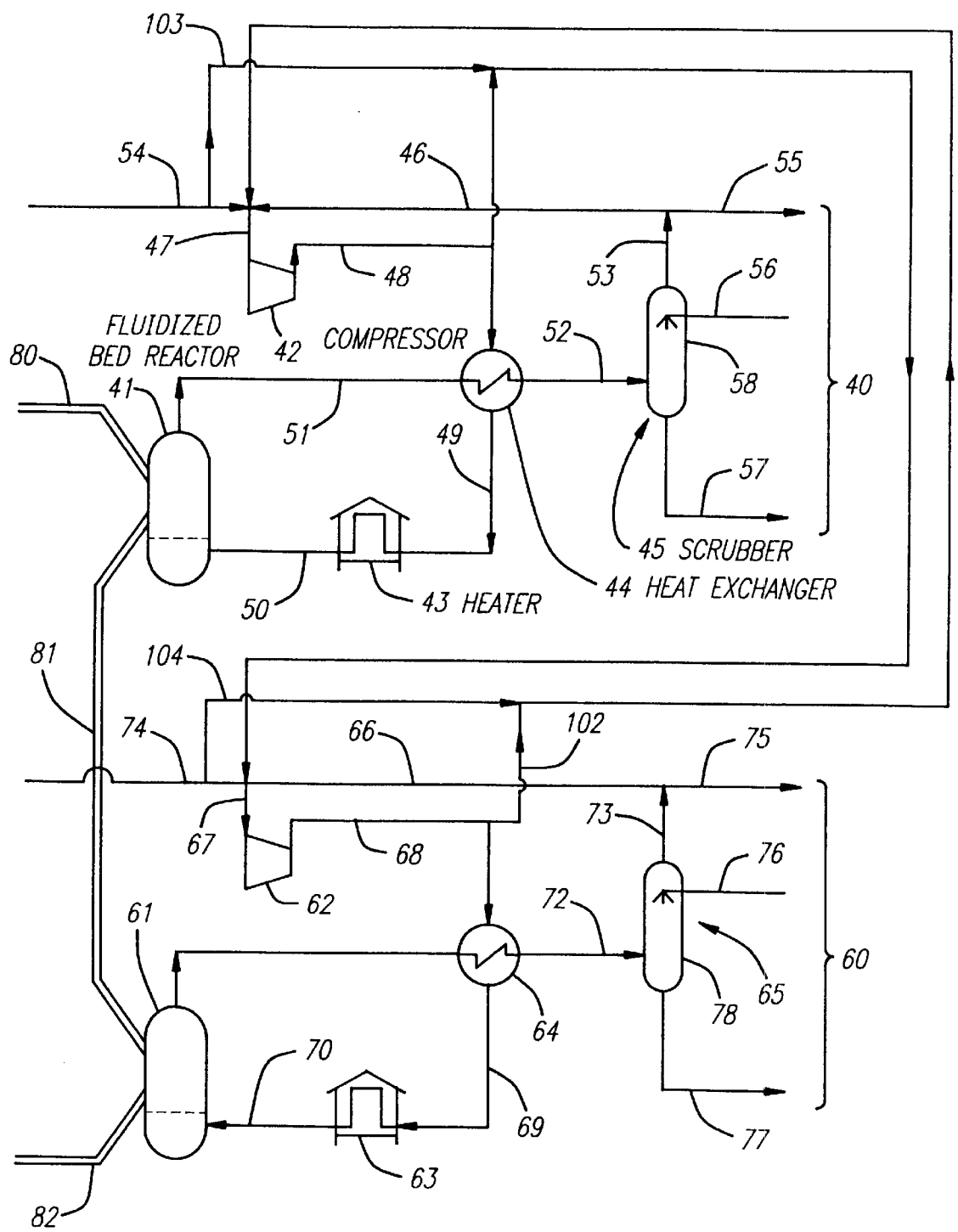
FIG. 16 is a schematic diagram illustrating another embodiment of an apparatus for producing iron carbide, which is used for practicing a method for producing iron carbide according to one embodiment of the present invention.

To overcome such disadvantage, as shown in FIG. 16, auxiliary lines 101, 102, 103, and 104 are provided to connect circulating loops 40 and 60 for the respective reaction gases and to connect supply lines 54 and 74 of the gas components in the apparatus of FIG. 5. Auxiliary lines 101, 102, 103, and 104 transfer a reaction gas in an auxiliary manner, thereby utilizing the circulating gas efficiently and adjusting and controlling the components in a reaction gas. Hereafter, one embodiment of the present method of producing iron carbide is summarized in Table 7, with reference to FIG. 16.

TABLE 7

Embodiment of material for iron making and proper metallization degree of the first-stage reaction process

| | Raw Materials | Material E for iron making | Material G for iron making |
|---|---|---|---|
| Composition of material | T-Fe | 66.0% | 66.5% |
| | $Fe_2O_3$ | 91.6% | 93.8% |
| | $Fe_3O_4$ | 2.8% | 1.4% |
| | Gangue content | 4.8% | 3.6% |
| | L.O.I | 0.8% | 1.2% |

Metallization ratio of the first-stage reaction process for shortening the whole reaction process time and composition
↓

| | X* | 0.543 (<⅔) | 0.836 (>⅔) |
|---|---|---|---|
| | Metallization degree | 55.7% | 31.4% |
| | T-Fe | 81.4% | 77.2% |
| | M-Fe | 45.4% | 24.2% |
| | FeO | 14.4% | 23.8% |
| | $Fe_3O_4$ | 34.3% | 47.8% |
| | Gangue content | 5.8% | 4.1% |

*X means the numeric of x in $FeO_x$

Figure 14B:
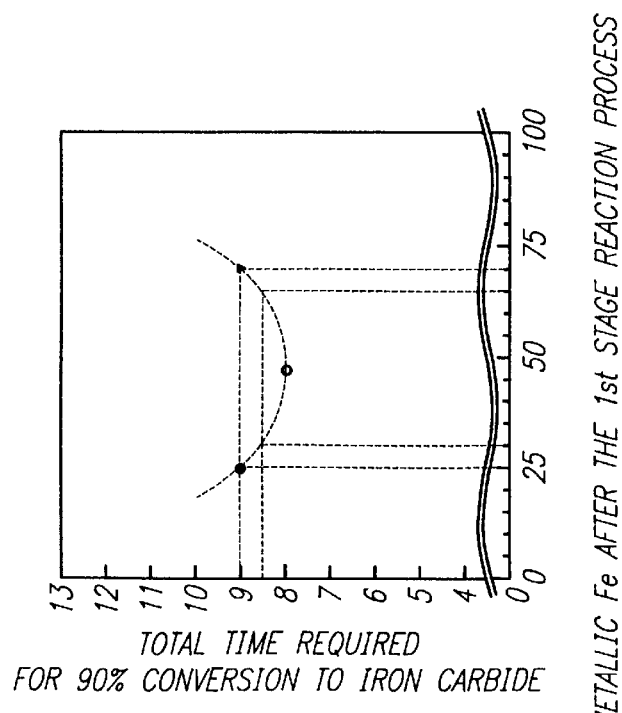
FIG. 14(a) and (b) are graphs illustrating a relationship between the metallization degree and reaction time in the first stage of the reaction process.
Figure 14A:
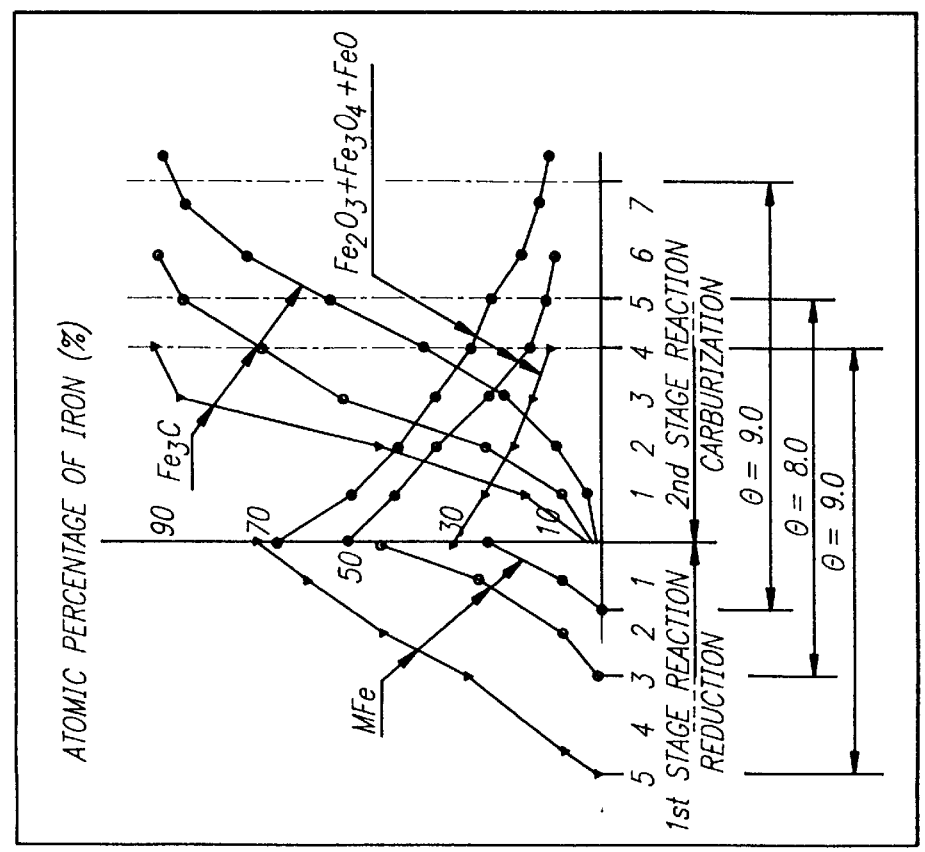

The embodiment summarized in Table 7 shows the results obtained by subjecting various iron-containing raw materials for iron making to a test wherein the degree of partial reduction in the first stage of the reaction process was changed in accordance with the process operations shown in FIG. 3 and using the apparatus shown in FIG. 1, followed by analysis as shown in FIG. 14. That is, it was assumed that a proper metallization degree in the first stage of the reaction process for minimizing total reaction time in case of the raw material E for iron making was 55.7 atom %, and x of corresponding $FeO_x$ was about 0.543. In this case, x was 0.543, which is smaller than ⅔. When using methane ($CH_4$) as the main carburizing reaction gas component, hydrogen must be supplied to the reaction gas in addition to methane because of lack of hydrogen for reduction. The amount of hydrogen supplied is about 40 to 80 $Nm^3$ per ton of iron carbide product. Two processes can be used as the process for supplying hydrogen, e.g., a direct supply from reducing gas supply line 54 via auxiliary line 103 shown in FIG. 16, and supply from first circulating loop 40 containing a large amount of hydrogen via auxiliary line 101. In first loop 40, the accumulation of methane due to the reaction according to the above formula (13) occasionally arises, and, therefore, bleeding can be conducted via line 55. In this case, it is more effective to transfer the gas of first loop 40 to second loop 60, which also requires supplying methane, via auxiliary line 101, thereby solving the problem efficiently.

In case of the raw material G for iron making shown in Table 7, the proper metallization ratio is low, such as 31.5 atom %, and x of the corresponding $FeO_x$ is high, such as 0.836, which is larger than ⅔. In this case, to the contrary to the above case, the concentration of hydrogen in the gas in second circulating loop 60 increases in order. This means that the amount of bleed via line 75 must be increased. In order to effectively utilize hydrogen, a proper amount of hydrogen can be transferred from second circulating loop 60 to first circulating loop 40 via auxiliary line 102 to decrease the amount of bleed via line 75. In the case of raw material G for iron making, it is necessary to draw about 160 $Nm^3$/one ton of product from second circulating loop 60, but it is most economical to transfer the gas of about 95 $Nm^3$/one ton of product to first circulating loop 40 via auxiliary line 102, followed by bleeding the remaining gas of about 65 $Nm^3$/one ton of product via line 57 to use as a fuel for gas heater 63.

5. Results of Tests Using Various Raw Materials and Operation Conditions

A bench scale test apparatus for testing various raw materials and operation conditions was made using the apparatus of the embodiment shown in FIG. 5, and then a specific experimental operation was conducted. The results are shown below.

Figure 20:
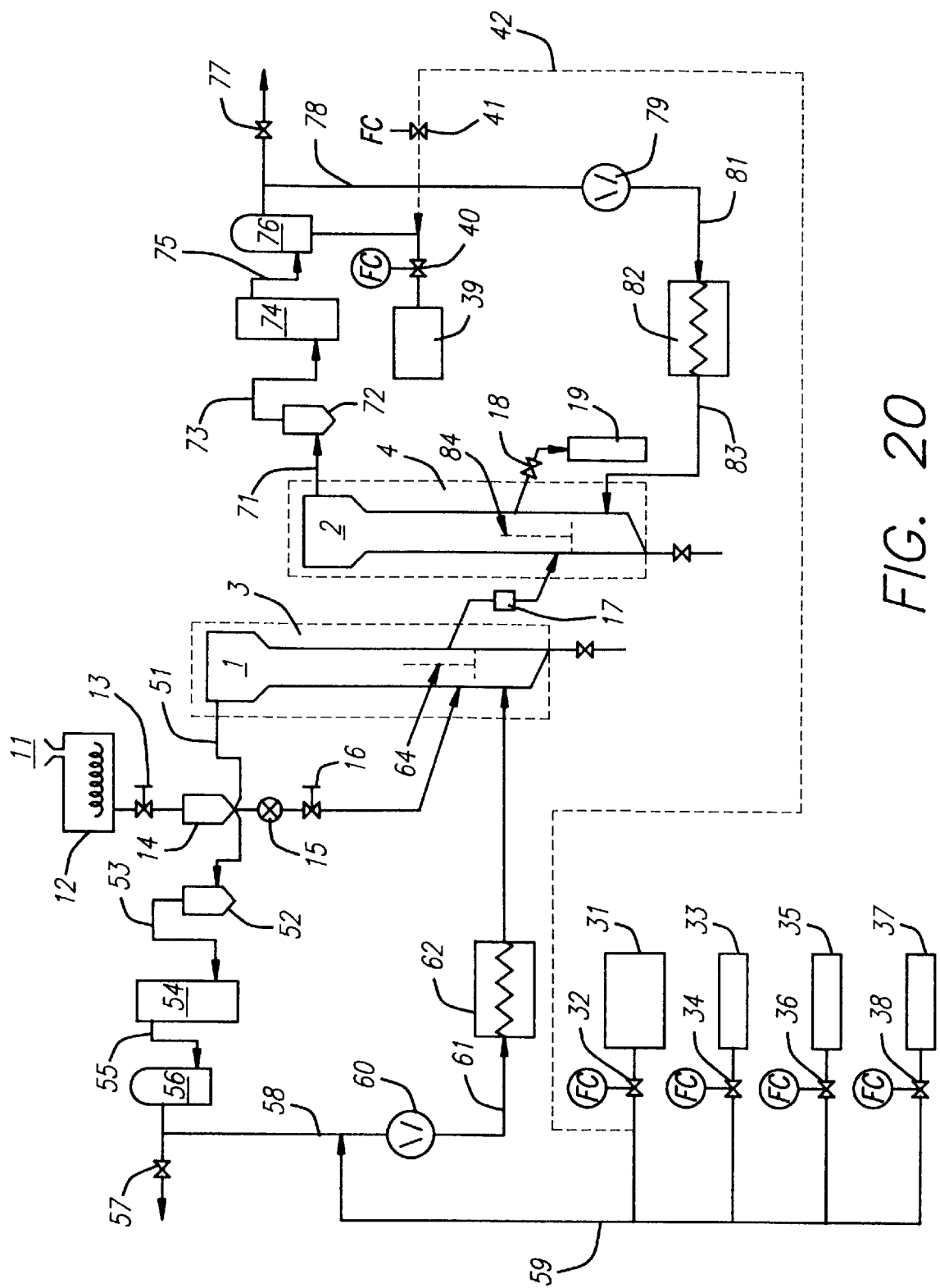
FIG. 20 is a schematic diagram illustrating one embodiment of a bench scale testing apparatus for testing various raw materials under various operating conditions, using the apparatus of FIG. 5.

The bench scale testing apparatus for testing has the construction set forth in FIG. 20 and comprises a first fluidized bed reactor 1 having an inner diameter of 200 mm and a second fluidized bed reactor having an inner diameter of 250 mm, and wherein each reactor is provided with one partition wall for controlling the flow of iron ore in the respective reactor.

First reactor 1 is provided with a circulating gas loop comprising a gas compressor 60, a gas preheater 62, first reactor 1, a dust collector 52, a gas-quenching device 54, and a gas holder 56.

After the gas reacted with the raw material in first reactor 1, fine particles in the gas are removed by dust collector 52, the gas is cooled by gas-quenching device 54 and water as the reaction product is removed, and then the gas is introduced into gas holder 56.

Thereafter, gas consumed in the reducing reaction (i.e., mainly hydrogen) is supplied from a supply gas line 59, and the excess gas is exhausted from the loop via a bleed gas line 57. Then, after adjusting to a predetermined pressure and temperature, gas is introduced into first reactor 1 using gas compressor 60 and gas heater 62.

Second reactor 2 also is provided with an identical gas circulating loop, but the supply gas cylinder contains a different gas because the gas consumed in the second reaction system is different.

In addition, the raw material is heated and pressurized in a heated raw material hopper 14, and then continuously introduced into first reactor 1 using a heated raw material feeder 15. The raw material then is continuously transferred to second reactor 2 using a high-temperature raw material transferring device 17. The product discharged from the second reactor 2 is stored in a high-temperature product storage container 19.

The reducing gas and the methane for carburization are supplied, apart from the industrial equipment, by admixing the respective gases, which are stored in high pressure cylinders, and a heat exchanger is eliminated. The operation was conducted continuously for 15 to 20 hours at the flow rate of 45 to 200 $Nm^3$/hour of gas in the first stage of the reaction process and flow rate of 60 to 300 $Nm^3$/hour of gas in the second stage of the reaction process, at a temperature of 550° to 750° C., and under a pressure of 2 to 7 atmospheres, to obtain a sufficiently stable state.

Further, the reference symbols in FIG. 20 identify the following elements:

1: First fluidized bed reactor (inner diameter: 200 mm, bed height: 5 m)

2: Second fluidized bed reactor (inner diameter: 250 mm, bed height: 7 m)
3, 4: Insulating refractory provided with auxiliary electric heater for first and second reactors
11: Raw material supply inlet
12: Raw material heating apparatus provided with a paddle
13, 16: Seal valve
14: Heated raw material hopper
15: Heated raw material feeder
17: High-temperature raw material transferring apparatus (pneumatic conveying type)
18: Seal valve
19: High-temperature product storage container
31: Hydrogen gas cylinder
33: CO gas cylinder
35: $CO_2$ gas cylinder
37: $CH_4$ gas cylinder
39: $CH_4$ gas cylinder
32, 34, 36: Flow control valve
38, 40, 41: Flow control valve
42: Hydrogen gas connecting tube
51, 71: First and second reactor outlet gas ducts
52, 72: First and second reactor outlet dust collector
53, 73: First and second reactor gas duct after removing dust
54, 74: First and second reactor gas-quenching device
55, 75: First and second reactor quench gas ducts
56, 76: First and second reactor gas holders
57, 77: First and second reactor bleed gas ducts
58, 78: First and second reactor circulating gas ducts
59, 79: First and second reactor auxiliary gas supply ducts
60, 80: First and second reactor circulating gas compressors
61, 81: First and second reactor compressor outlet gas ducts
62, 82: First and second reactor gas preheaters
63, 83: First and second reactor inlet gas ducts
64, 84: First and second reactor partition walls FIG. 15 summarizes the results of an experiment with respect to the influence of various temperatures and pressures, when using the same hematite iron ore that was used in the experiments of FIGS. 2, 3, and 4 and using the apparatus of FIG. 20.

Figures 15A, 15B:
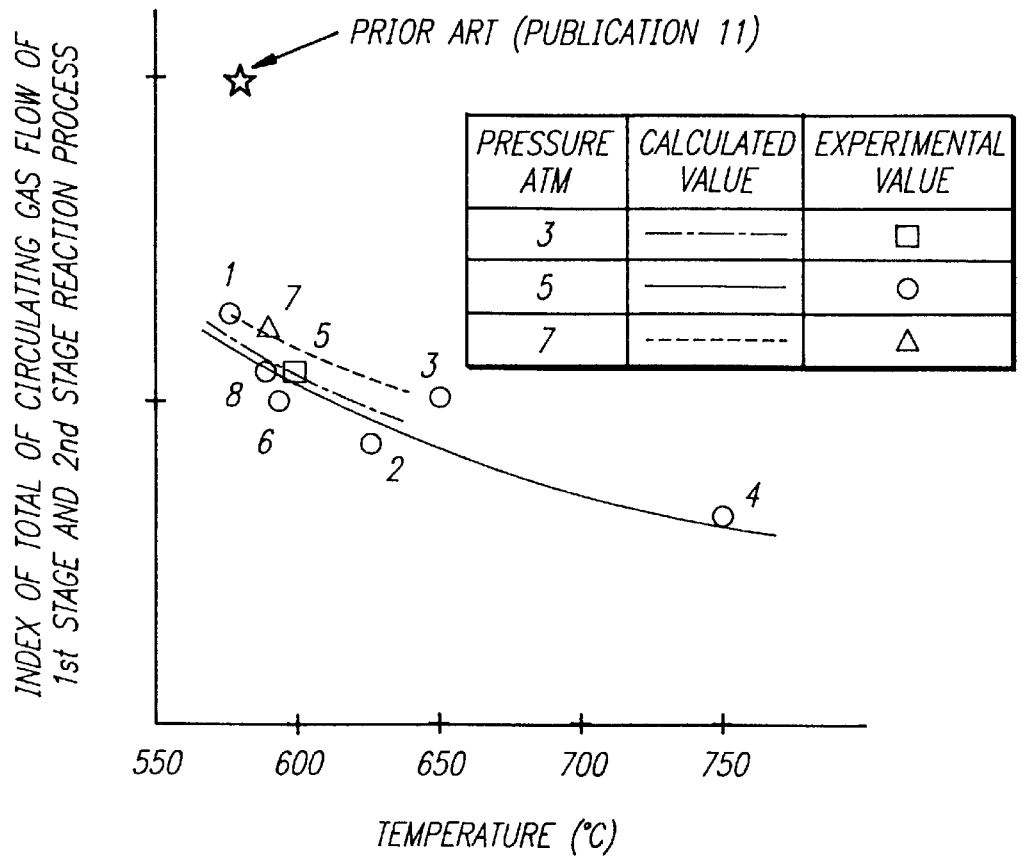
FIG. 15(a) is a graph illustrating a relationship between circulating gas flow rate and temperature/pressure.
FIG. 15(b) is a table illustrating a composition of the product.

With respect to the effect of the temperature, as shown in FIG. 15, when reaction temperature is increased, the reaction time not only is shortened, but also the amount of the reaction gas is decreased. The residual iron content in the iron carbide product is converted into magnetite ($Fe_3O_4$), which is stable to moisture in air, by adjusting the reaction temperature to about 575° C.

With respect to the effect of the pressure, as is apparent from the relationship of experiment Nos. 5, 6, and 7 summarized in FIG. 15, the amount of reaction gas decreases as the pressure changes in the order of 7 atmosphere, 3 atmosphere, and 5 atmosphere. Accordingly, the maximum effect can be exhibited at a pressure of about 3 to 6 atmosphere.

Figure 19:
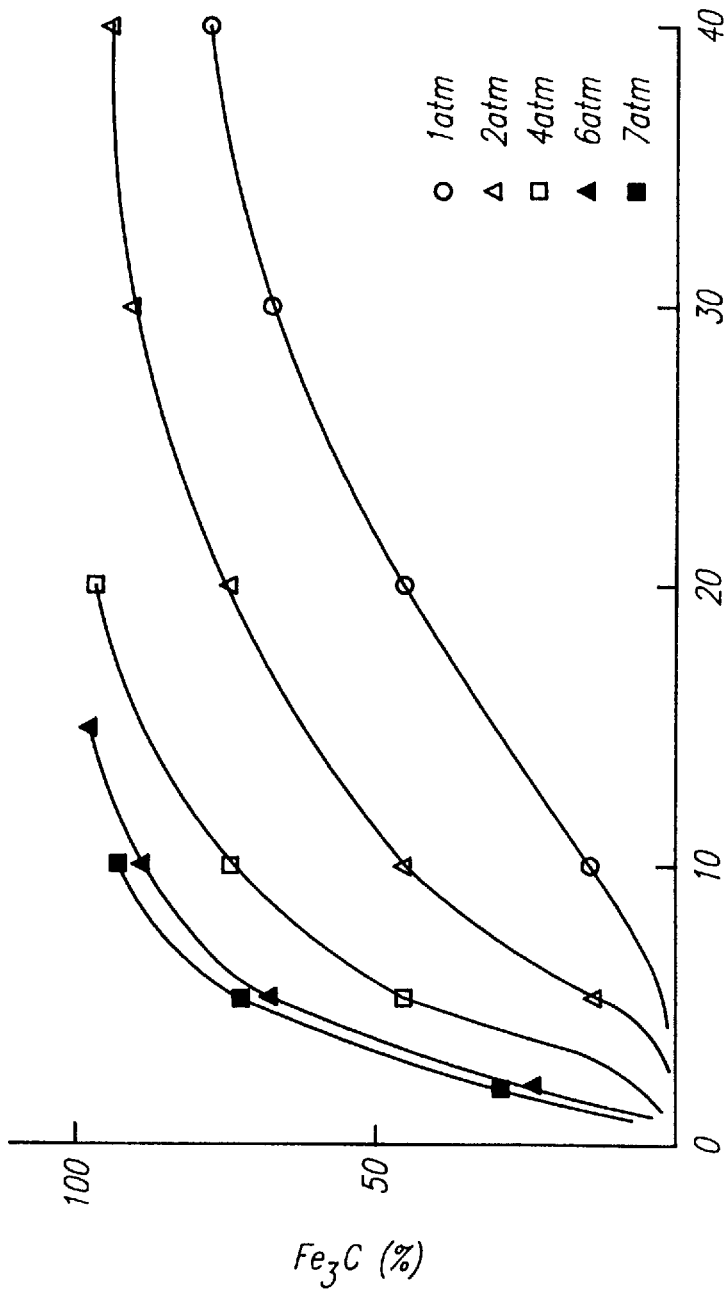
FIG. 19 is a graph illustrating results of a test on the effect of gas pressure using a thermo-balance carburizing reaction experimental device.

On the other hand, the rate of the carburizing reaction in the second phase of the reaction process was measured at various gas compositions and pressures at 600° C., under the conditions of the present invention, by using a small high temperature and high pressure thermo-balance-type reaction experimental device. The results are summarized in FIG. 19. As is apparent from the results in FIG. 19, a shortened reaction time was obtained due to increase in pressure. However, the effect of pressure begins to decrease at about 6 to 7 atmosphere.

The results of tests on various iron ores and recycled materials for iron making generated in iron works, and using the apparatus of FIG. 20, are summarized in Table 6. The operating conditions of the tests are set forth in Table 4, that is, the pressure was 5 atmosphere and the temperature was 650° C. The components of the reaction gases were controlled in the range of the components of the first and second stage inlet gases as set forth in Table 4.

TABLE 6

Results of production of iron carbide with respect to various iron-containing materials for iron making

| | | Sample No. | | | | | |
| --- | --- | --- | --- | --- | --- | --- | --- |
| | Kind | No. 1 Hematite ore | 2 Magnetite ore | 3 Limonite ore (containing iron hydroxide) | 4 Mill scale generated from iron works | 5 Dust generated from converter | 6 Dust generated from direct iron-making furnace |
| Composition of material (dry base percentage) | T.Fe | 66.24% | 66.79% | 58.9% | 72.61% | 77.7% | 76.0% |
| | $Fe_2O_3$ | 94.9% | 1.56% | 2.1% | — | 40.4% | 47.5% |
| | FeOOH | — | — | 91.5% | — | — | — |
| | $Fe_3O_4$ | — | 90.91% | — | 84.03% | — | — |
| | FeO | — | — | — | 12.93% | 15.3% | 15.7% |
| | M-Fe | — | — | — | 1.75% | 37.6% | 30.6% |
| | Gangue | 5.1% | 7.53% | 6.4% | 1.29% | 6.7% | 6.2% |
| | L.0.I | — | — | — | — | — | — |
| Product of the first stage reaction process | Metallization (%) | 46.2% | 54.9% | 47.1% | 51.1% | 52.0% | 50.9% |
| | $X(FeO_x)$ | 0.731 | 0.755 | 0.692 | 0.678 | 0.661 | 0.664 |
| | M-Fe | 36.25% | 43.37% | 36.31% | 42.9% | 41.27% | 40.80% |
| | $Fe_2O_3$ | 5.95% | — | 3.94% | — | 2.55% | 2.63% |
| | $Fe_3O_4$ | 37.45% | 30.03% | 35.69% | 37.1% | 39.02% | 28.91% |
| | FeO | 14.28% | 17.71% | 15.74% | 18.5% | 10.20% | 21.07% |
| | Reaction time | 1.5 h | 1.8 h | 1.3 h | 1.6 h | 0.8 h | 1.0 h |
| Product of | Ratio of | 91.2% | 91.9% | 93.7% | 88.1% | 90.4% | 93.2% |

TABLE 6-continued

Results of production of iron carbide with
respect to various iron-containing materials for iron making

| | | Sample No. | | | | | |
|---|---|---|---|---|---|---|---|
| | Kind | No. 1 Hematite ore | 2 Magne- tite ore | 3 Limonite ore (con- taining iron hydrox- ide) | 4 Mill scale generated from iron works | 5 Dust gen- erated from converter | 6 Dust gen- erated from di- rect iron- making furnace |
| the second stage reaction process | conver- sion into iron carbide | | | | | | |
| | $Fe_3O$ | 82.77% | 80.90% | 84.10% | 84.17% | 81.95% | 85.20% |
| | $Fe_2O_3$ | 2.61% | — | 1.93% | — | 1.23% | 1.53% |
| | $Fe_3O_4$ | 2.62% | 4.91% | 1.78% | 7.84% | 5.93% | 3.29% |
| | FeO | 4.78% | 4.57% | 2.97% | 5.78% | 3.29% | 2.32% |
| | M-Fe | 0.66% | 0.36% | 0.28% | 0.62% | 0.32% | 0.68% |
| | Gangue | 6.54% | 9.25% | 8.93% | 1.59% | 7.28% | 6.97% |
| | Reaction time | 4.9 h | 5.3 h | 5.2 h | 5.5 h | 5.4 h | 5.1 h |

As is apparent from the results summarized in Table 6, 1 to 3% of unreacted hematite ($Fe_2O_3$) is contained in the product, even though the reaction time is slightly increased in comparison with the results shown in FIG. 4, and, at the same time, the carburization ratio is lower than the results in FIG. 4. It is theorized that the reason for such a result is that, although a partition wall is provided in the interior of the fluidized bed reactors of the first and the second stages to control the flow of iron ore and to prevent unreacted raw materials from mixing with reacted raw materials, only one partition wall is present because the diameter of the fluidized bed reactor is small, and also the width of the flow line in the fluidized bed reactor is narrow in comparison with the bed height, making the ratio of fluidized bed height to diameter large. Therefore, the fluidizing state is unstable, which leads to mixing of raw material and product, and in addition, the flow of raw material in the bed could not be controlled sufficiently, resulting in the inclusion of 1 to 3% of hematite in the final $Fe_3C$ product. An industrial reactor provided with a partition wall, as shown in FIG. 6 or FIG. 7, solves the problem because the diameter of the reactor is sufficiently large and a stable fluidizing state can be obtained.

6. Fluidized Bed Reactor

Figure 6A:
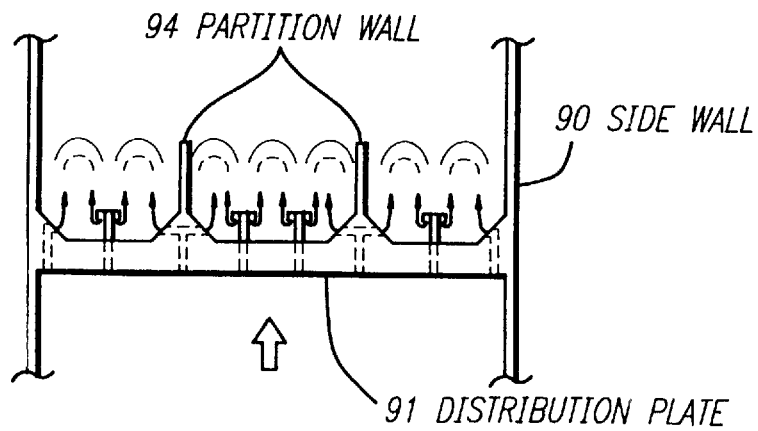
FIG. 6(a) is a longitudinal cross section illustrating a fluidized bed reactor which can be used in the production apparatus of FIG. 5.
Figure 6B:
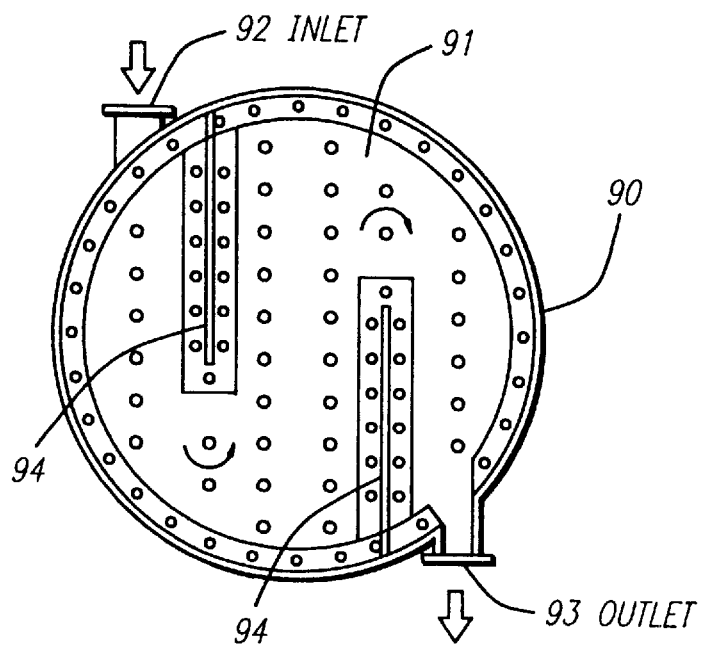
FIG. 6(b) is a transverse cross section of the said reactor.
Figure 7A:
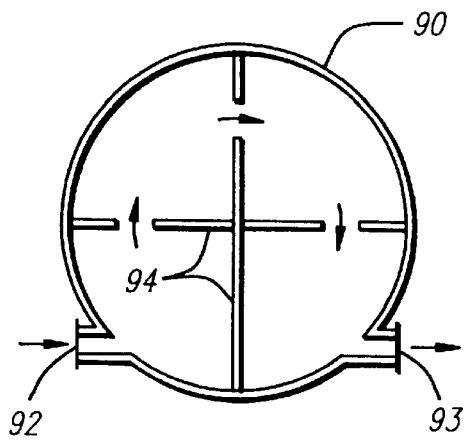
FIG. 7(a) and 7(e) are transverse cross sections illustrating various embodiments of the fluidized bed reactor of FIG. 6.
Figure 7B:
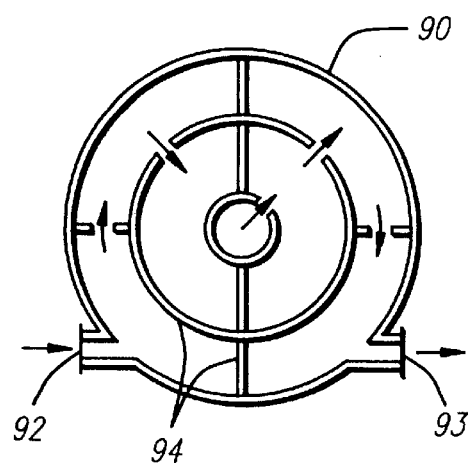
Figure 7C:
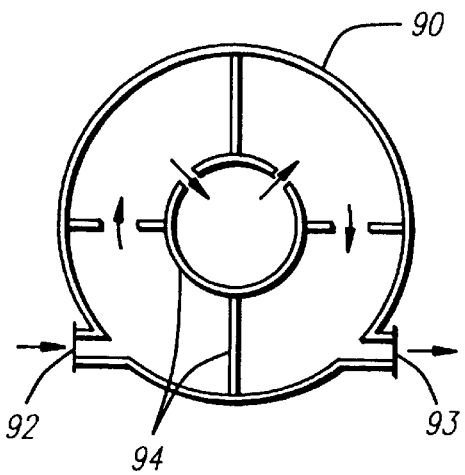
Figure 7D:
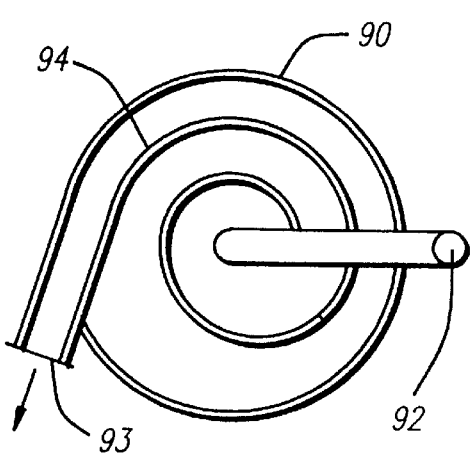
Figure 7E:
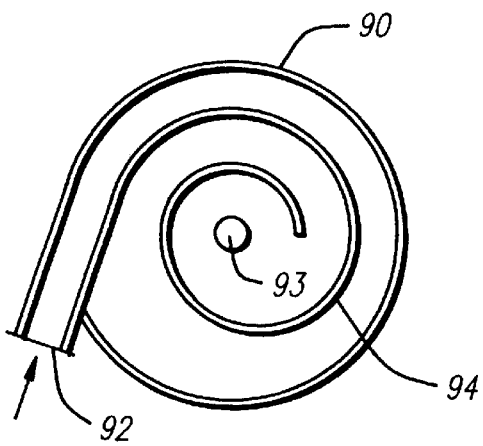

Improvements in the fluidized bed reactors are explained below. As is shown in FIGS. 6(a) and 6(b), partition walls 94 for preventing a direct movement of reactor feed from an inlet 92 to an outlet 93 were provided in the interior of a cylindrical side wall 90 and on the upper surface of a distribution plate 91. Accordingly, it takes a sufficiently long time for the reactor feed to pass through the fluidized bed reactor, and, therefore, the reaction degree is high. A plurality of fluidized bed reactors normally are connected in series in order to increase the reaction degree, but the requisite number of the reactors is reduced by using a fluidized bed reactor of the present invention. By the use of a present fluidized bed reactor, it is possible to prevent unreacted feed and reacted feed from admixing, and, therefore, the reactor feed is uniformly reacted. Further, a fluidized bed reactor of the present invention is not limited to the embodiment shown in FIG. 6, and can be of any design which provides a long flow distance from reactor inlet 92 to outlet 93. Other embodiments are illustrated in FIGS. 7(a) through 7(e). Of these embodiments, the reactors of FIGS. 7(d) and 7(e) have no dead zone where a swirl or a stagnation of material arises in the flow line of the feed into the reactor, thereby making it possible to perform a more uniform reaction.

Figures 22A, 22B:
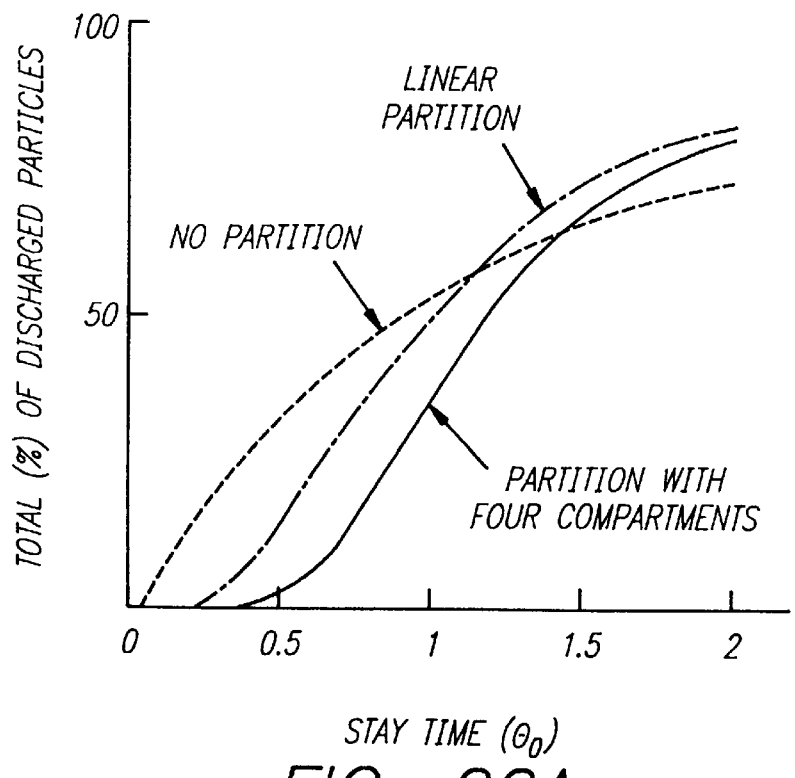
FIG. 22(a) is a graph illustrating FIGS. 1, 5, 6, and 7 as results of cold model tests which were carried out to confirm the effect of partition walls present in the interior of a fluidized bed reactor.
FIG. 22(b) is a table illustrating a conversion ratio of iron carbide which was derived from the results in the table.

The results of a cold model test performed to confirm the effects of partition walls present in the interior of the fluidized bed reactor, and iron carbide conversion ratio of the product calculated from the results, are shown in FIG. 22.

When no partition wall is provided, 40% of the total raw material particles introduced to the reactor were discharged within half (i.e., 0.5 θ) of the average residence time θ (amount of total particles residing in reactor/amount of particles introduced or discharged per unit time). In addition, 63% and 77% of the raw material, respectively, was discharged within θ and 1.5 θ. On the other hand, when the interior of the same fluidized bed reactor is partitioned to contain four compartments, or when a linear partition is provided in the interior of the reactor, the discharge amount within 0.5 θ was 3% and 14%, respectively.

As is apparent from the above test results, when using a fluidized bed reactor having no partition wall, the residence time of the particles in the reactor is short, and amount of particles discharged without being converted to iron carbide becomes large. Therefore, the expected iron carbide conversion ratio when using a particular iron-containing raw material for iron making is about 66%.

To the contrary, when the interior of the same fluidized bed reactor is partitioned in an identical manner as that of the above tests, the amount of particles discharged in a small period of time decreases. Therefore, the expected iron carbide conversion ratio, when using the same iron-containing raw material for iron making, is improved to about 90%, if the reactor is partitioned into four compartments. If a linear partition is provided, the conversion ratio is improved to about 84%.

7. Vertical Moving Bed Reactor

Figure 21:
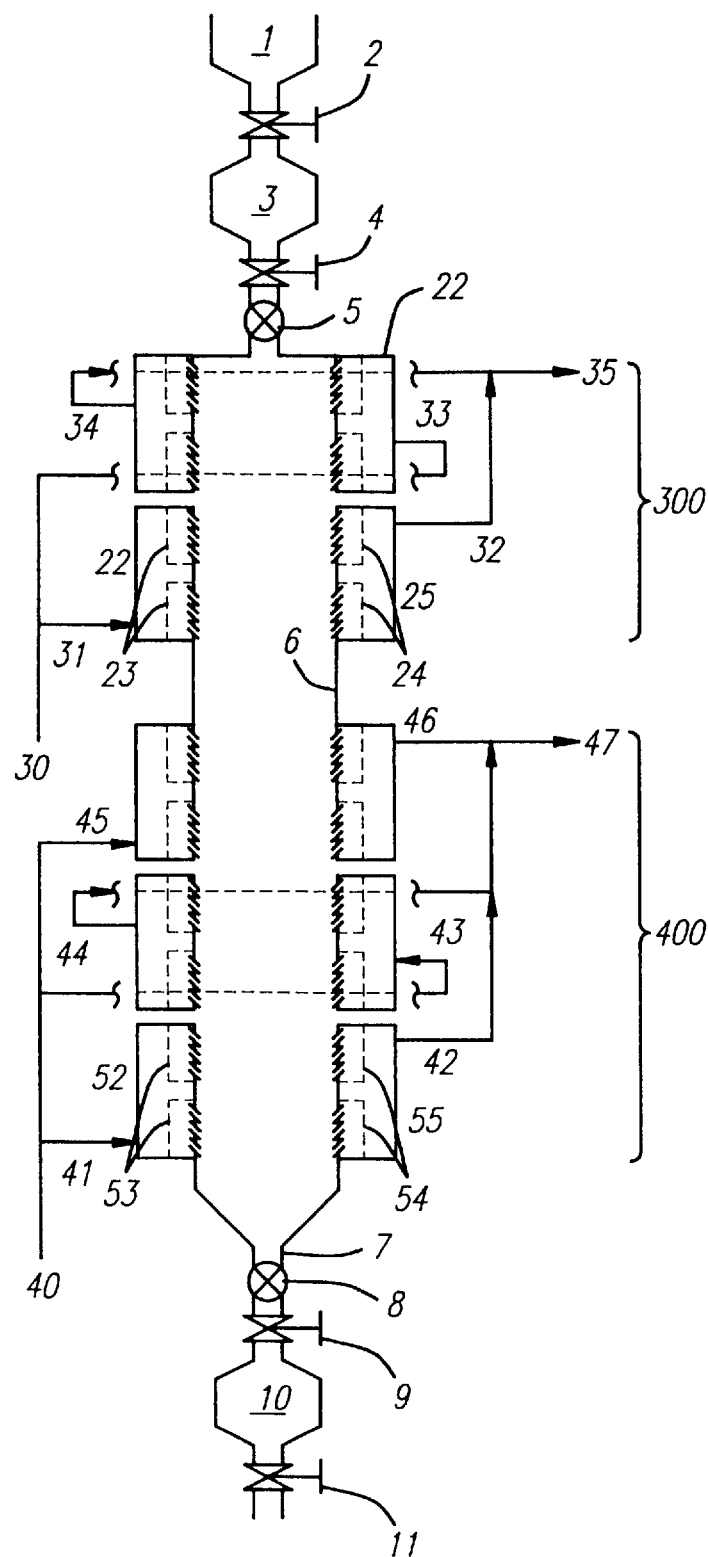
FIG. 21 is a schematic diagram illustrating one embodiment of a vertical moving bed reactor of the present invention, which is suitable for producing iron carbide from a coarse grained raw material, wherein a gas flows horizontally and the solid raw material is charged and moves vertically through the reactor.

FIG. 21 is a schematic diagram illustrating a vertical moving bed reactor of the present invention, wherein a gas suitable for producing iron carbide from a coarse grain raw material flows horizontally and the charged raw material flows vertically.

As illustrated in FIG. 21, in this embodiment, a vertical moving bed reactor 6 has a first reaction zone 300 and a second reaction zone 400 to form a single vertical moving bed reactor.

In first reaction zone 300, a gas inlet 30 for the gas of the first stage of the reaction process provides gas to an inlet wind box 23 via lines 31 and 33 through an inlet header 22 to flow into the moving bed, almost horizontally, and then is discharged as an outlet gas through an outlet 35 for the first stage of the reaction process via an outlet wind box 24 and an outlet header 25 through lines 32 and 34.

Also, in second reaction zone 400, a gas inlet 40 for the second stage of the reaction process is discharged as an outlet gas through outlet 47 for the second stage of the reaction process via lines 41, 43, 45, 42, 44, and 46.

The feed raw material is pressurized via elements 1 through 5 prior to introduction to first reaction zone 300. The reduction is conducted in first reaction zone 300 and the remaining reduction and a carburization is conducted in second reaction zone 400, and then the product is depressurized via elements 7 through 11 and discharged semicontinuously.

Each reference symbol in FIG. 21 denotes the following elements.

1: Raw material feed hopper
2, 4: Gas seal valves
3: Raw material intermediate hopper
5: Raw material feed hopper with control device
6: Rectangular vertical moving bed reactor
7: Product outlet
8: Product discharge apparatus with control device
9, 11: Gas seal valves
10: Discharge intermediate hopper
22: Reaction gas inlet header for the first-stage reaction process
23: Reaction gas inlet wind box for the first-stage reaction process
24: Reaction gas outlet wind box for the first-stage reaction process
25: Reaction gas outlet header for the first-stage reaction process
30: Inlet reaction gas for the first stage reaction process
31, 33: Reaction gas inlet ducts for the first-stage reaction process
32, 34: Reaction gas outlet ducts for the first-stage reaction process
35: Outlet reaction gas for the first-stage reaction process
40: Inlet reaction gas for the second-stage reaction process
41, 43, 45: Reaction gas inlet ducts for the second stage reaction process
42, 44, 46: Reaction gas outlet ducts for the second-stage reaction process
47: Outlet reaction gas for the second-stage reaction process
52: Reaction gas inlet header for the second-stage reaction process
53: Reaction gas inlet wind box for the second-stage reaction process
54: Reaction gas outlet wind box for the second-stage reaction process
55: Reaction gas outlet header for the second-stage reaction process

EFFECT OF THE INVENTION

As is apparent from the above, a method and apparatus for producing iron carbide in accordance with the present invention has the following advantages.

1. According to the present method of producing iron carbide, the reaction time can be shortened. The reaction can be conducted at a high temperature without causing sintering, and, therefore, the reaction speed can be further increased and reaction time can be shortened. An apparatus having the same scale as an apparatus practicing a conventional method, therefore, exhibits increased production capacity.

The flow rate of the reducing and carburizing gases which are required for the first and second stages of the reaction process can be substantially reduced because of an increase in reaction temperature, a shortening of the reaction time, etc. Therefore, even though the flow of reaction gas requires two systems and the apparatus is complex, the method provides sufficient economies because of a decrease in the flow rate of the reaction gas and an increase in production, etc.

Furthermore, because various adjustments can be employed in each reaction phase, which cannot be employed in a conventional method for producing iron carbide, such as the single process described in the publication of Japanese translation of International Patent Application No. 6-501983 (PCT/US91/05198), the present method is a flexible process, thereby making it easy to control process parameters, such as the conversion ratio and reaction speed.

2. According to the present method of producing iron carbide, advantages described in above item 1 can be exhibited by using a gas which is readily available.

The amount of the reforming gas for producing hydrogen and carbon monoxide can be decreased in comparison with a conventional process which uses a gas-containing carbon monoxide (CO) as the main component of the carburizing reaction, as described in publications 6 and 7. In addition, energy consumption is decreased and the process equipment can be made small.

Furthermore, the reaction time of the first stage can be substantially shortened in comparison with a conventional process disclosed in German Patent No. 4320359, which comprises adding a portion of the carburizing reaction gas to the outlet reaction gas of the second stage, and using the resulting gas in the first-stage reaction, thereby making it possible to achieve economics due to downsizing of the equipment.

3. According to the present method of producing iron carbide, even in cases of reacting an iron-containing raw material other than hematite, e.g., other iron oxides, or iron hydroxides, or mixtures with metallic iron including dust and scale from iron works, it is possible to conduct the first stage of the reaction process to reduce the raw material to a determined reduction degree/metallic iron content, irrespective of the state of the iron oxides contained in the iron-containing raw material or the state of the iron in the mixture of metallic iron, which is suitable for feeding to the second stage of the reaction process. As a result, methane can be used as a suitable gas component of the main reducing and carburizing reactions in the second stage of the reaction process. Therefore, it is possible to operate flexibly, while shortening the reaction time and decreasing the amount of reaction gas.

When the iron carbide product is used as the iron raw material in an iron-making or steel-making furnace, it is possible to supply a $Fe_3C$ product having a predetermined property to perform a requisite function, such as the function of supplying a source of iron and energy, or the function of accelerating a refining action due to $CO_2$ generated by reacting oxygen of the residual oxide with carbon of iron carbide, while exhibiting the advantages described in the above items (1) and (2) in accordance with the process requirements of the respective furnace.

Furthermore, by adjusting the metallization degree in the first stage of the reaction process in the range of 25 to 70 atom %, methane can be added exclusively to the second stage of the reaction process, and the total reaction time can be shortened. By adjusting the metallization degree within the range of 30 to 65 atom %, the total reaction time can be minimized. By adjusting the final conversion ratio from said iron-containing raw material for iron-making into iron carbide to at least 75 atom %, the raw material for iron making or steel making having an optimum conversion ratio can be produced.

4. According to the present method of producing iron carbide of the advantages described in the above item (1) can be exhibited by using gas compositions which are readily available.

5. According to the present method of producing iron carbide, the reaction speed of the reducing reaction can be controlled, and, therefore, it is possible to control the reduction degree and the reaction time required to obtain a predetermined reduction degree in the first stage of the reaction process.

The reaction speed of the carburizing reaction can be controlled, and, therefore, it is possible to control the carburization ratio (i.e., conversion ratio into iron carbide), and the reaction time required for obtaining a predetermined carburization ratio in the second stage of the reaction process. Therefore, it is possible to precisely control the reaction to a predetermined carburization ratio, while preventing free carbon generation.

6. According to the present method of producing iron carbide, the amount of the hydrogen gas generated from methane during the carburizing reaction in the second stage of the reaction process, and the amount of hydrogen required for the reducing reaction can be adjusted to be essentially identical, and, therefore, the second stage of the reaction process can be conducted merely by supplying a carburizing gas in view of chemical reaction balance. Therefore, it is not necessary to perform a complicated adjustment of the composition of the reaction gas. Even if a circulating reaction gas is used, the hydrogen and methane gases can be respectively supplied in the first and second stages of the reaction process, and, therefore, an operation, such as an adjustment of the composition of the reaction gas, is easy.

7. According to the present method of producing iron carbide, a suitable production state, which maintains the value of the iron carbide product and prevents generation of free carbon, is attained.

8. According to the present method of producing iron carbide, a temperature of the reaction can be selected which is suitable for exhibiting the above advantages while increasing reaction speed without adversely affecting the heat-resistant structure of the reactors.

9. According to the present method of producing iron carbide, disadvantages, such as sintering, generation of free carbon, etc., do not arise, and a shortened reaction time can be attained by increasing the reaction operation temperature, as shown in FIGS. 3 and 4. The form of the residual iron in the iron carbide product can be magnetite ($Fe_2O_4$), which is stable to moisture in air, by setting the reaction temperature at about 575° C. or less, as shown in FIG. 15. Therefore, the present method demonstrates a flexibility in reaction parameters.

10. According to the present method of producing iron carbide, the reaction temperature is suitable such that a slowdown in the conversion to iron carbide is prevented, a shortening of the reaction time is realized, and an economy in equipment is realized.

11. According to the present method of producing iron carbide, the region where FeO and Fe exist in the Fe—H—O system reduction equilibrium is wide, and the region where magnetite exists can be narrowed. Therefore, a slowdown in the carburizing reaction due to the presence of magnetite is suppressed, and the reaction time is shortened.

Figure 11A:
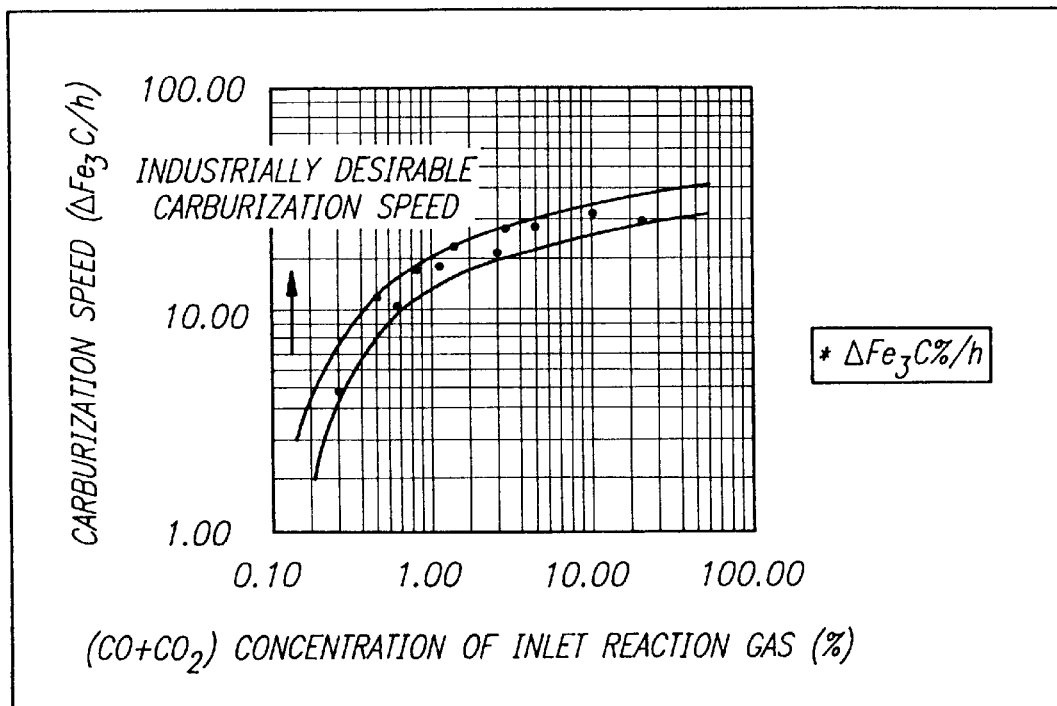
FIG. 11(a) is a graph illustrating a relationship between concentration of carbon monoxide and carbon dioxide and carburizing speed.
Figure 11B:
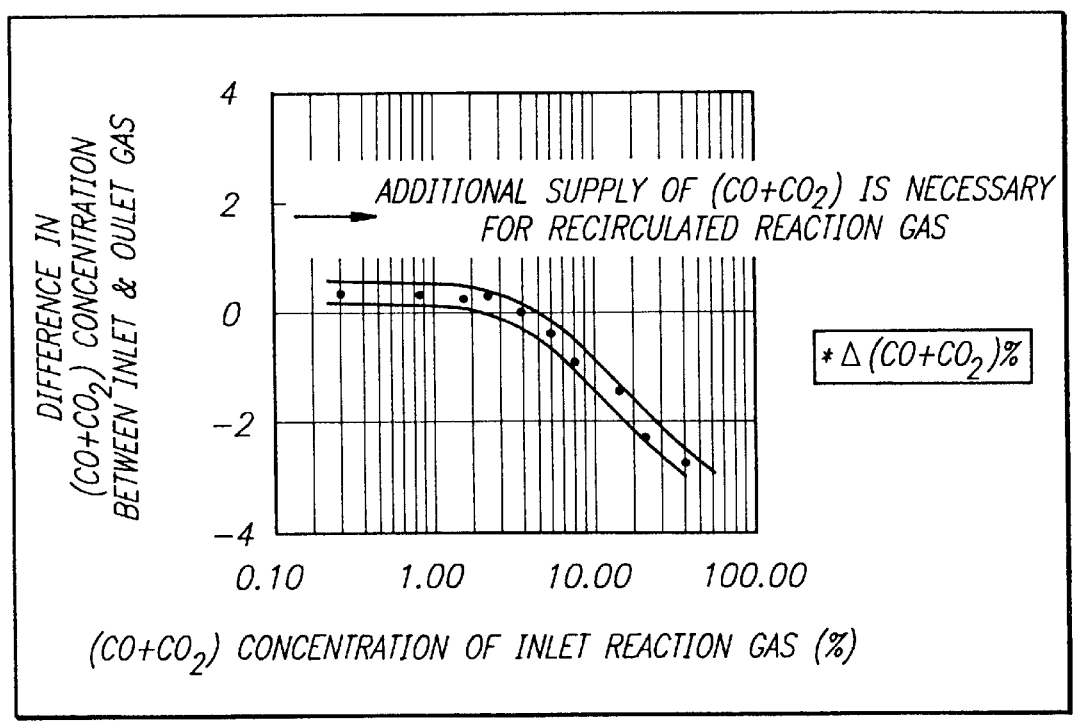
FIG. 11(b) is a graph illustrating an increase/decrease ratio of carbon monoxide and carbon dioxide in the reaction gas.
Figure 12:
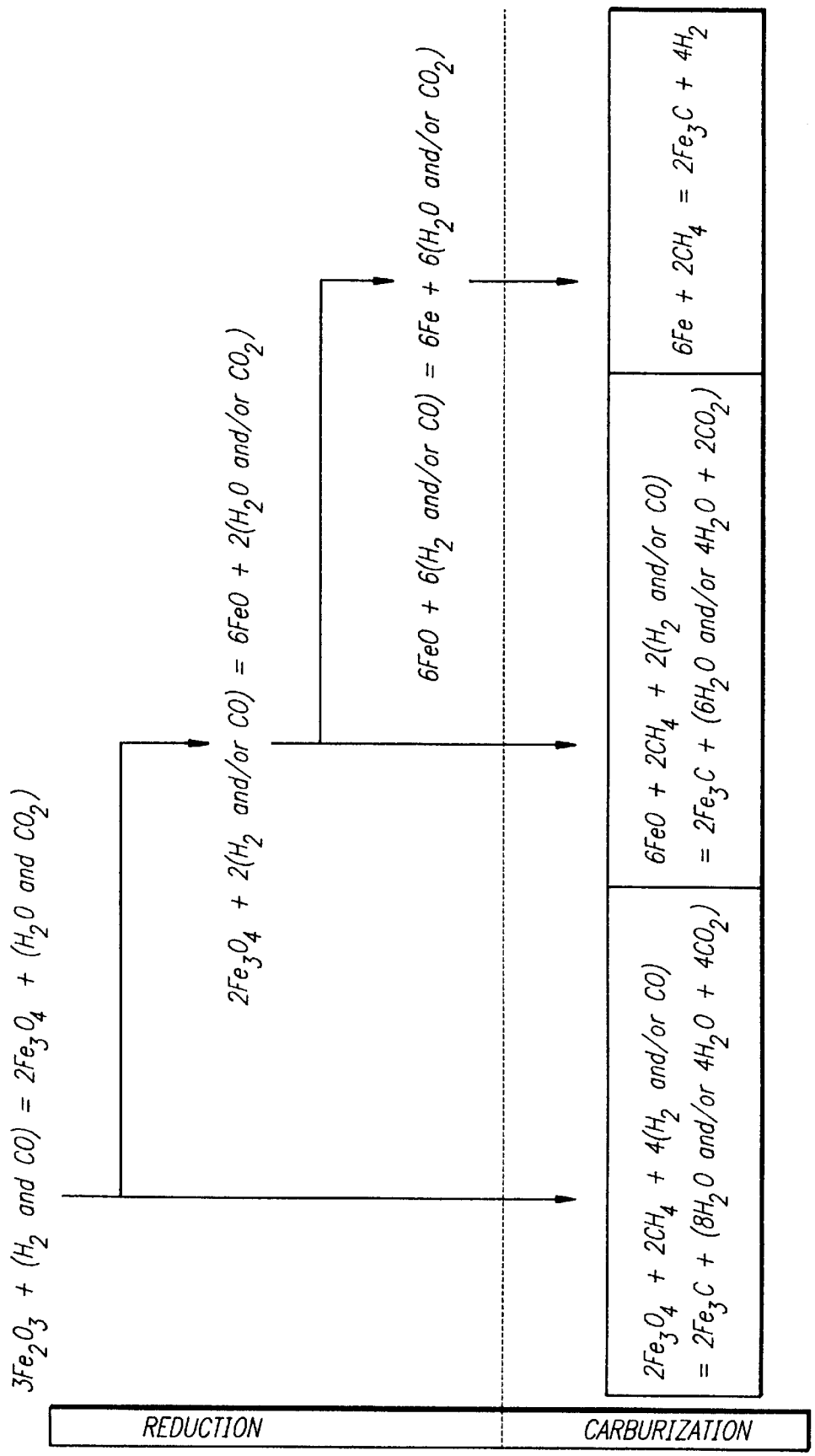
FIG. 12 is a schematic illustrating a relationship between the reducing reaction and carburizing reaction in a process where iron carbide is produced from iron oxide.
Figures 13A, 13B:
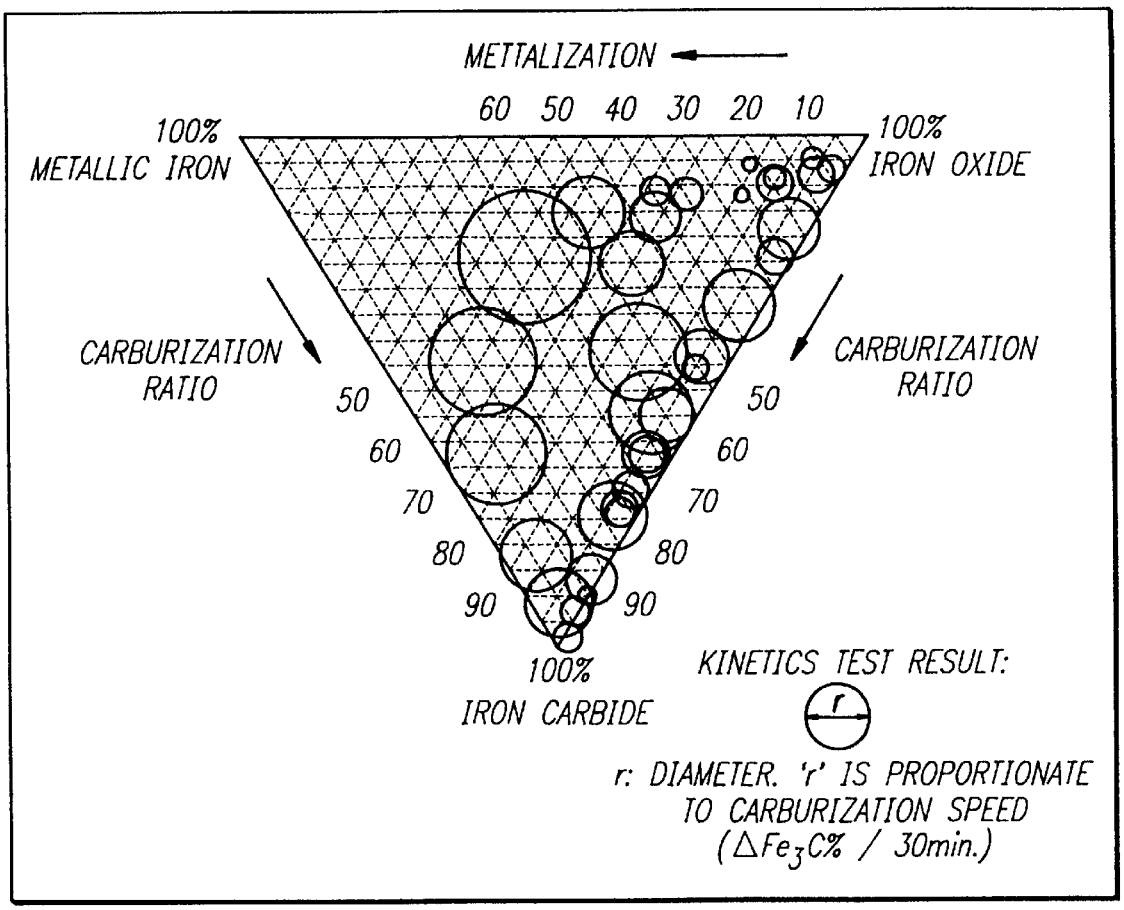
FIG. 13(a) is a graph illustrating a relationship between the carburizing speed and ratio of metallic iron-to-iron oxide.
FIG. 13(b) is a table illustrating examples of the apparent carburizing reaction speed with respect to each raw material.

12. According to the present method of producing iron carbide, the concentration of carbon monoxide and carbon dioxide in the reaction gas can be increased. As a result, the reaction speed of the carburizing reaction can be increased substantially, as shown in FIG. 11.

13. According to the present method of producing iron carbide, a pressure which is suitable for achieving the above advantages while shortening the reaction time and satisfying the economy is possible.

14. According to the present method of producing iron carbide, it is possible to prevent the raw material from agglomerating and failing to flow due to condensation of steam generated at the beginning of the reaction. Therefore, disadvantages, such as decrease in reaction speed, reaction degree, etc., are prevented.

Figure 8:
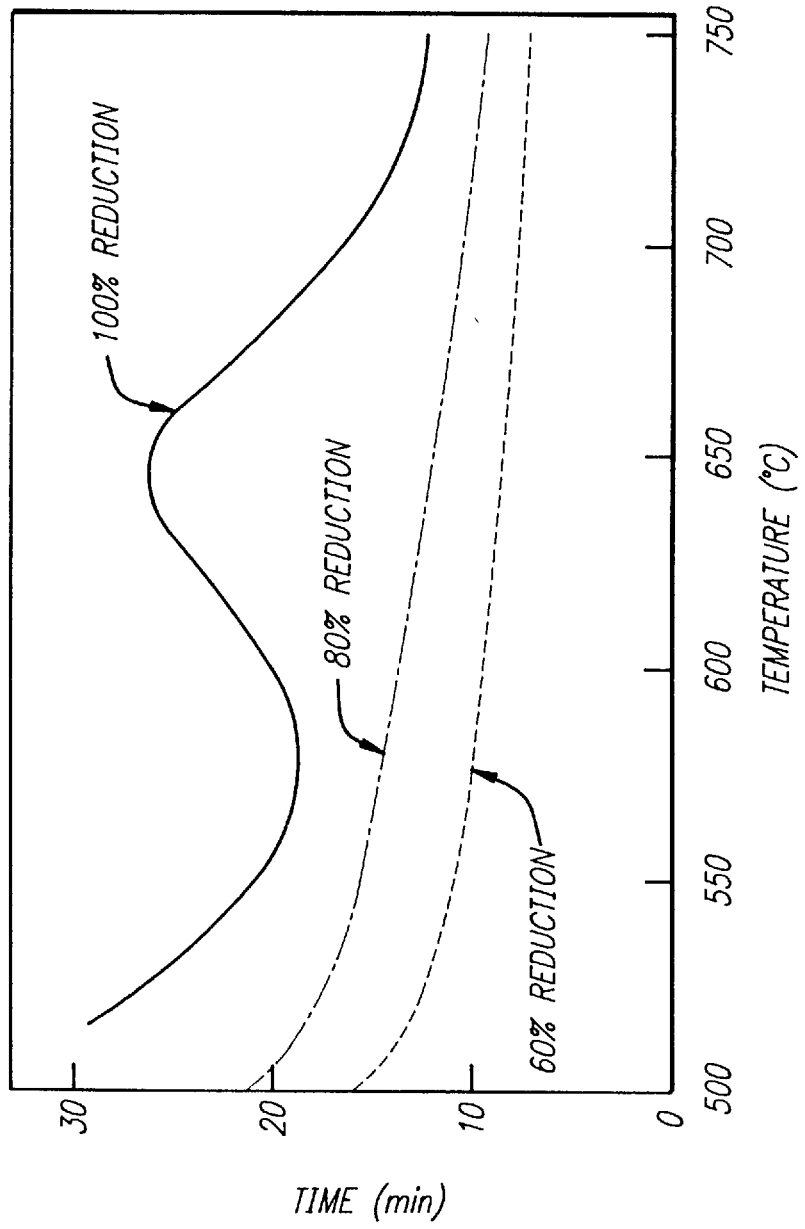
FIG. 8 is a graph illustrating a relationship between the reaction temperature (°C.) and reaction time (min) in the reducing reaction of iron ore.

15. The present method can be carried out using the present apparatus for producing iron carbide. In an industrial scale apparatus, reaction time is shortened and energy consumption is decreased, and the equipment is made small in comparison to the apparatus used in a conventional method, as shown in the right-end column of FIG. 8a.

16. According to the present apparatus for producing iron carbide, the reaction is optimized by bringing the solid iron-bearing raw material for iron making into contact with the reducing and carburizing gases for conversion into iron carbide.

17. According to the present apparatus for producing iron carbide, the reaction speed can be increased. Therefore, the number of the fluidized bed reactors required to increase reaction speed can be decreased.

It also is possible to prevent the raw material at the inlet portion and the $Fe_3C$ product at the outlet portion of the reactor from mixing, and, therefore, the reaction can proceed uniformly. Furthermore, a product having high iron carbide conversion ratio can be obtained in a reaction having the same average residence time.

18. According to the present apparatus for producing iron carbide, a high utilization efficiency of the reaction gas and a high iron carbide conversion ratio can be realized despite using a raw material comprising mainly coarse particles, which typically is not suitable for fluidizing, and practical use of equipment can be accomplished.

What is claimed is:

1. A method of producing iron carbide from an iron-containing material comprising hematite which comprises:

providing a first distinct apparatus and a second distinct apparatus, each apparatus having an independent circulating loop of reaction gas, the reaction gas being distinct for each loop;

passing the iron-containing material comprising hematite to said first distinct apparatus;

contacting said iron-containing material in said first distinct apparatus with said independent circulating loop of reaction gas to partially reduce said iron-containing material to have a reduction degree of about 50% to 65%;

passing said partially reduced iron-containing material to said second distinct apparatus; and contacting the partially reduced iron-containing material in said distinct apparatus with an independent circulating loop of reaction gas to reduce and carburize said iron-containing material.

2. The method of claim 1 wherein the reaction gas in said first distinct apparatus comprises hydrogen as a predominant component, and the reaction gas in the second distinct apparatus is a reducing and carburizing gas comprising hydrogen and methane as predominant components.

3. The method of claim 1 wherein the temperature in said first distinct apparatus and said second distinct apparatus is 590° to 750° C.

4. The method of claim 1 wherein the partial reduction in said first distinct apparatus and the reduction and carburization reaction in said second distinct apparatus are performed at a reaction pressure of 1 to 9.9 kgf/cm² G.

5. A method of producing iron carbide, the method comprising:

providing a first distinct apparatus and a second distinct apparatus, each apparatus having an independent circulating loop of reaction gas, the reaction gas being distinct for each loop;

passing an iron-containing material to said first distinct apparatus;

contacting said iron-containing material in said first distinct apparatus with said independent circulating loop of reaction gas to produce a partially reduced iron-containing material having a metallic iron content of 25 to 75 atom %;

passing said partially reduced iron-containing material to said second distinct apparatus; and contacting said partially reduced iron-containing material with an independent loop of reaction gas until there is a conversion ratio of partially reduced iron-containing material to iron carbide of more than about 75 atom %.

6. The method of claim 5 wherein the iron-containing material is selected from the group consisting of an iron ore, a material generated in an iron-making process, an iron oxide, an iron hydroxide, and mixtures thereof.

7. The method of claim 5 wherein the iron-containing material is selected from the group consisting of hematite, magnetite, wustite, ferrous hydroxide, ferric hydroxide, and mixtures thereof.

8. The method of claim 5 wherein the iron-containing material comprises hematite.

9. The method of claim 5 wherein the reacting gas in said first distinct apparatus is incapable of forming iron carbide and has a composition:

$H_2+H_2O \geq 40\%$, $CO+CO_2 \leq 10\%$, $CH_4 \leq 30\%$, $H_2O+CO_2 \leq 10\%$, $N_2$ and the other inert gas components $\leq 25\%$.

10. The method of claim 5 wherein the reaction gas in said second distinct apparatus has a composition:

$H2+CH_4 \geq 65\%$ ($CH_4 \geq 20\%$), $15\% \geq CO+CO_2 \geq 0.5\%$, $H_2O \leq 1.5\%$, $N_2$ and the other inert gas component $<20\%$.

11. The method of claim 5 wherein methane is added to the reaction gas in said first distinct apparatus, and hydrogen or methane is added to the reaction gas in said second distinct apparatus.

12. The method of claim 5 wherein the iron-containing material is partially reduced in said first distinct apparatus in an amount of 50 to 65%.

13. The method of claim 5 wherein the conversion ratio of the iron-containing material to iron carbide is 90 to 99 atom % of total iron content.

14. The method of claim 5 wherein the reaction in said first distinct apparatus is performed at a temperature of 550° to 750° C.

15. The method of claim 5 wherein the reaction in said second distinct apparatus is performed at a temperature of 550° to 750° C.

16. The method of claim 15 wherein the temperature is 590° to 750° C.

17. The method of claim, 7 wherein a partial pressure of steam in the reaction gas in said first distinct apparatus is decreased by removing water vapor from said reaction gas.

18. The method of claim 5 wherein carbon dioxide and hydrogen are added to the reaction gas in said second distinct apparatus.

19. The method of claim 5 wherein the reactions in said first distinct apparatus and said second distinct apparatus are performed at a reaction pressure of 1 to 9.9 kgf/cm² G.

20. The method of claim 5 wherein the iron-containing material is preheated or precooled to a temperature within ±100° C. of reaction temperature prior to performing the partial reduction reaction in said first distinct apparatus, and prior to performing the reduction and carburization reaction in said second distinct apparatus.

* * * * *